(12) United States Patent
Arakane et al.

(10) Patent No.: US 11,669,705 B2
(45) Date of Patent: Jun. 6, 2023

(54) PRINTING APPARATUS, METHOD FOR CONTROLLING PRINT EXECUTION SECTION, AND PRINTING SYSTEM

(71) Applicant: BROTHER KOGYO KABUSHIKI KAISHA, Nagoya (JP)

(72) Inventors: Satoru Arakane, Nagoya (JP); Masao Mimoto, Kitanagoya (JP); Tsuyoshi Ito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 38 days.

(21) Appl. No.: 17/347,911

(22) Filed: Jun. 15, 2021

(65) Prior Publication Data

US 2021/0402798 A1 Dec. 30, 2021

(30) Foreign Application Priority Data

Jun. 26, 2020 (JP) .............................. JP2020-110981

(51) Int. Cl.
*G06K 15/10* (2006.01)
*B41J 2/21* (2006.01)

(52) U.S. Cl.
CPC .......... *G06K 15/107* (2013.01); *B41J 2/2132* (2013.01); *B41J 2/2146* (2013.01)

(58) Field of Classification Search
CPC ..................... G06K 15/105; G06K 15/107
See application file for complete search history.

(56) References Cited

U.S. PATENT DOCUMENTS

2013/0003094 A1* 1/2013 Horii .................... G06K 15/105
358/1.9
2017/0274643 A1 9/2017 Takeuchi et al.
2018/0213125 A1 7/2018 Takeuchi et al.

FOREIGN PATENT DOCUMENTS

JP 2017-170719 A 9/2017
JP 2018-118382 A 8/2018

* cited by examiner

*Primary Examiner* — Julian D Huffman
(74) *Attorney, Agent, or Firm* — Merchant & Gould P.C.

(57) ABSTRACT

A printing apparatus includes a print execution section and a controller. The print execution section includes a printing head which has nozzles for discharging ink of specified color, the nozzles being aligned in a first direction; a head driver which drives the printing head to discharge the ink of the specified color thereby forming dots of the specified color on a printing medium; and a conveyor which conveys the printing medium relative to the printing head in any direction of the first direction and a second direction intersecting with the first direction. The controller is configured to: acquire object image data; generate a plurality of pieces of dot data, which represent formation states of the dots of the specified color, for a plurality of pixels by using the object image data; and print a printing image on the printing medium by using the plurality of pieces of dot data.

5 Claims, 15 Drawing Sheets

RGB COLOR SPACE CC

COLOR EVALUATION INFORMATION CI

| No. | RGB VALUE | | | WEIGHT |
|---|---|---|---|---|
| | R | G | B | Wt |
| 1 | 0 | 0 | 0 | Wt1 |
| 2 | 0 | 0 | 32 | Wt2 |
| 3 | 0 | 0 | 64 | Wt3 |
| 4 | 0 | 0 | 96 | Wt4 |
| 82 | 32 | 32 | 0 | Wt82 |
| 83 | 32 | 32 | 32 | Wt83 |
| 84 | 32 | 32 | 64 | Wt84 |
| 85 | 32 | 32 | 96 | Wt85 |
| 86 | 32 | 32 | 128 | Wt86 |
| 726 | 255 | 255 | 160 | Wt726 |
| 727 | 255 | 255 | 192 | Wt727 |
| 728 | 255 | 255 | 224 | Wt728 |
| 729 | 255 | 255 | 255 | Wt729 |

PATTERN DATA

RECORDING RATE

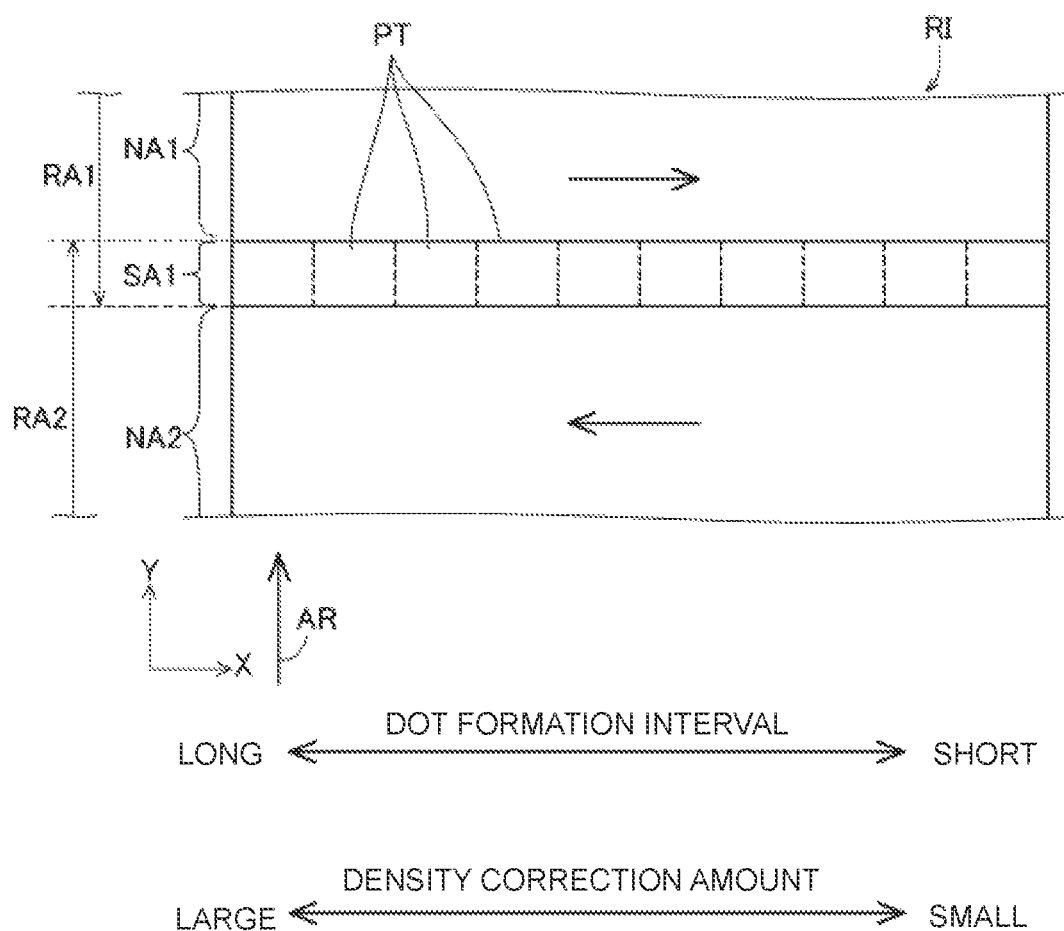

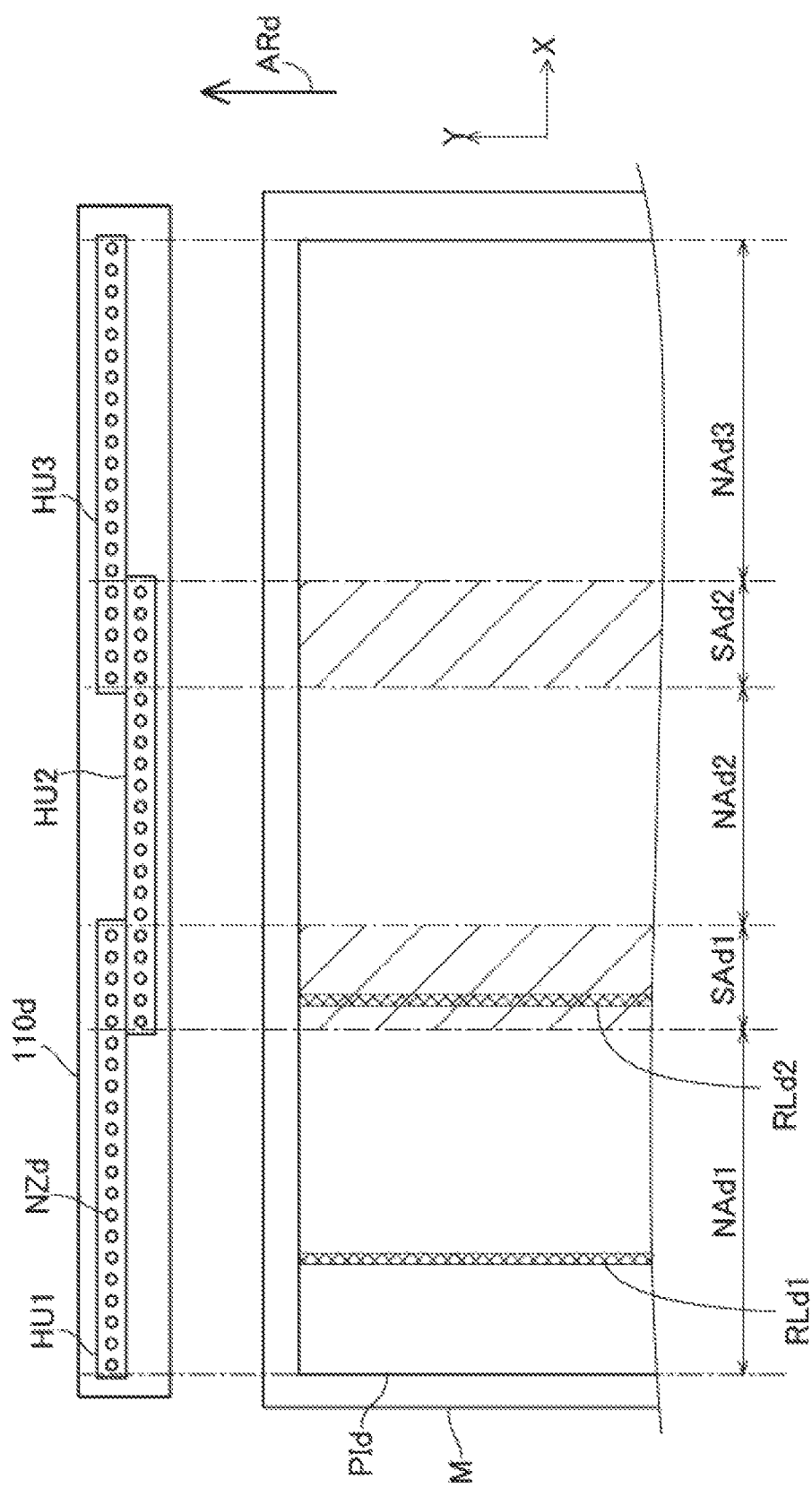

ND METHOD FOR
PRINTING APPARATUS, METHOD FOR CONTROLLING PRINT EXECUTION SECTION, AND PRINTING SYSTEM

CROSS REFERENCE TO RELATED APPLICATION

The present application claims priority from Japanese Patent Application No. 2020-110981, filed on Jun. 26, 2020, the disclosure of which is incorporated herein by reference in its entirety.

BACKGROUND

Field of the Invention

The present description relates to a printing apparatus provided with a print execution section and a controller, a method for controlling the print execution section, and a printing system.

Description of the Related Art

A printer is known as an exemplary printing apparatus, in which when the printing is performed by a plurality of passes, then a partial area, which is disposed in the vicinity of a band boundary, is printed by two times of passes, and the other areas are printed by one time of pass. A plurality of dots, which constitute a raster line disposed in a joint area printed by two times of passes, are formed by using two nozzles. A plurality of dots, which constitute a raster line disposed in an ordinary area printed by one time of pass, are formed by using one nozzle. A table, which is different from a look-up table to be used for the color conversion process for the ordinary area, is used for a look-up table to be used for the color conversion process for the joint area. Accordingly, it is possible to mitigate the color irregularity (color unevenness) which would otherwise appear between the ordinary area and the joint area.

SUMMARY

In the case of the technique described above, the material of the printing medium, the temperature, and the humidity are taken into consideration as the factors of occurrence of the color irregularity. However, there has been such a possibility that the color irregularity is not mitigated sufficiently by merely taking these factors into consideration.

According to an aspect of the present invention, there is provided a printing apparatus including:

a printing head which has a plurality of nozzles for discharging ink of specified color, the nozzles being aligned in a first direction;

a head driver which drives the printing head to discharge the ink of the specified colors thereby forming dots of the specified color on a printing medium; and a conveyor which conveys the printing medium relatively with respect to the printing head in any direction of the first direction and a second direction intersecting with the first direction; and a controller configured to:
acquire object image data;
generate a plurality of pieces of dot data, which represent formation states of the dots of the specified color, for a plurality of pixels by using the object image data; and
print a printing image including the dots of the specified color on the printing medium by causing the printing head and the conveyor to discharge the ink of the specified color and convey the printing medium by using the plurality of pieces of dot data, wherein the printing image includes two first areas and a second area positioned between the two first areas, the printing image includes a plurality of raster lines each including the dots of the specified color aligned in the second direction, the raster lines include a plurality of first raster lines included in each of the two first areas, and a plurality of second raster lines included in the second area, the dots of the specified color constructing each of the first raster lines are formed by using one of the nozzles corresponding to the first raster line, the dots of the specified color constructing each of the second raster lines are formed by using two or more of the nozzles corresponding to the second raster line, the controller is configured to:
execute a first area process for first partial image data which is included in the object image data and which corresponds to each of the two first areas, to generate a plurality of pieces of first partial dot data which are included in the plurality of pieces of dot data and which correspond to each of the two first areas; and
execute a second area process for second partial image data which is included in the object image data and which corresponds to the second area, to generate a plurality of pieces of second partial dot data which are included in the plurality of pieces of dot data and which correspond to the second area, the second area process is a process for generating the second partial dot data such that an image of the second area is printed at a density which is not more than a density in a case of executing the first area process for the second partial image data, the two or more nozzles, which correspond to each of the second raster lines, include a first nozzle and a second nozzle, the controller is configured to:
determine a correction level, which is a degree to lower the density of the image of the second area in the second area process, based on a dot formation interval which is an interval between a formation timing of the dots of the specified color by using the first nozzle and a formation timing of the dots of the specified color by using the second nozzle; and
execute the second area process based on the correction level, and the controller is configured to:
determine the correction level to be a first correction level in a case that the dot formation interval is a first interval; and
determine the correction level to be a second correction level which has a large degree to lower the density of the image of the second area as compared with the first correction level, in a case that the dot formation interval is a second interval which is longer than the first interval.

In the second area in which the plurality of dots having the specified colors on the raster line are formed by the two or more nozzles, the dots, which are formed by using the first nozzle, are spread on the printing medium, and then the dots are formed by using the second nozzles so that the dots formed by the second nozzle are overlapped with the dots formed by the first nozzle. On this account, the total areal size of the dots of the specified colors in the second area tends to be larger than the total areal size of the dots of the specified colors in the first area. On this account, even when the images are printed by using the same image data, then the image, which is printed on the second area, has the density which tends to be higher than the density of the image which is printed on the first area. In this context, the degree to raise the density in the second area is more increased as the dot formation interval is longer. According to the configuration as described above, the correction level is determined to be the first correction level if the dot formation interval is the first interval. If the dot formation interval is the second interval which is longer than the first interval, the correction level is determined to be the second correction level at which the degree to lower the density of the image of the second area is large as compared with the first correction level. As a result, the printing apparatus can print the image of the second area at the density which is appropriate in conformity with the dot formation interval. Therefore, the printing apparatus can effectively suppress the color irregularity which would be otherwise generated between the first area and the second area, in conformity with the dot formation interval.

Note that the technique, which is disclosed in the present description, can be realized in various forms. The technique can be realized, for example, in forms of the printing apparatus, a method for controlling the printing apparatus, a printing system, an image processing method, a computer program for realizing the function of the apparatus and the method, and a recording medium on which the computer program is recorded.

BRIEF DESCRIPTION OF THE DRAWINGS

FIG. 14 explains density correction amounts according to a modified embodiment.

FIG. 15 explains a line printer according to a modified embodiment.

DESCRIPTION OF THE EMBODIMENT

First Embodiment

<Configuration of Printer 200>

Figure 1:
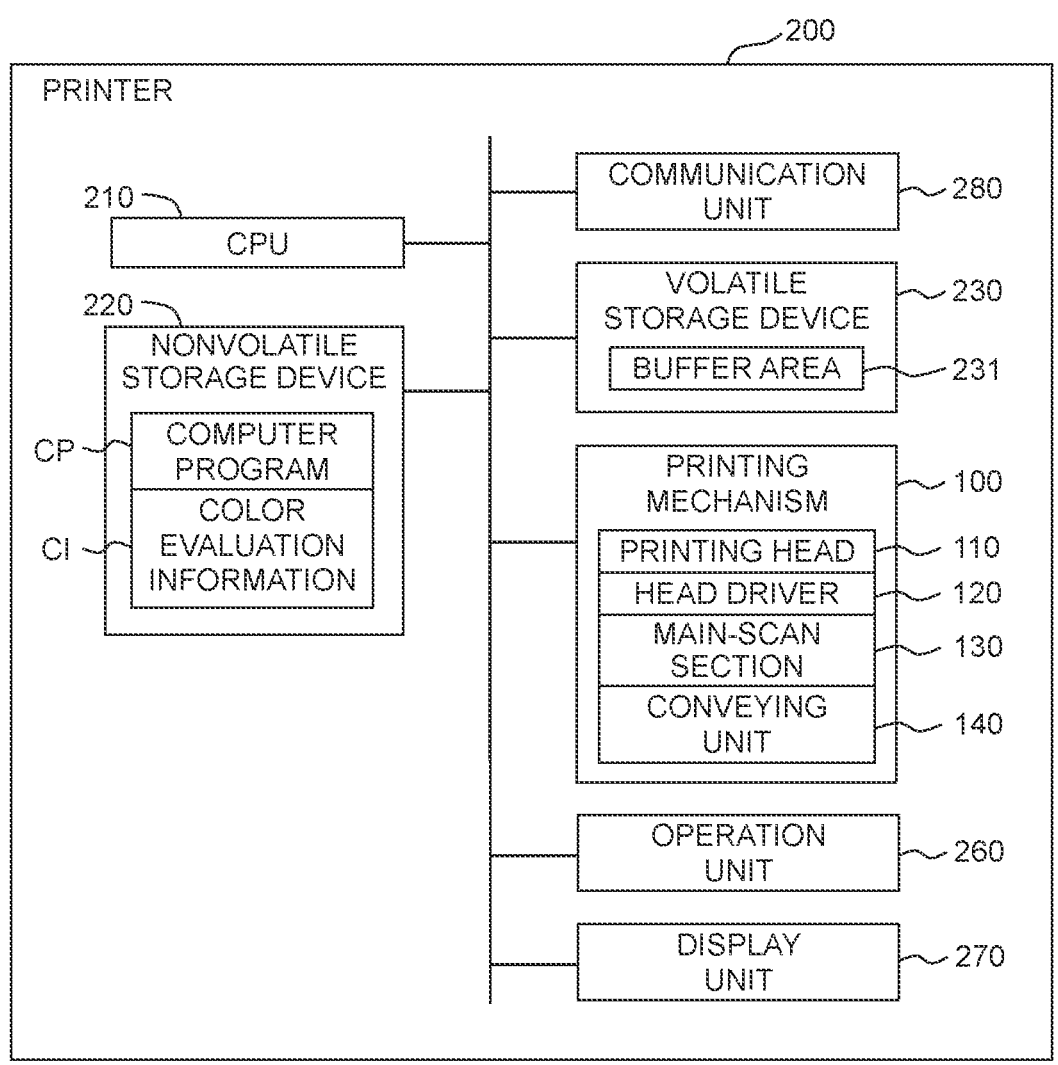
FIG. 1 shows a block diagram illustrating configuration of a printer of a first embodiment.

At first, configuration of a printer 200 will be explained with reference to FIGS. 1 to 2B.

The printer 200 comprises, for example, a printing mechanism 100 which is provided as the print execution section, CPU 210 which is provided as the controller for the printing mechanism 100, a nonvolatile storage device 220 which is, for example, a hard disk drive, a volatile storage device 230 which is, for example, a hard disk or a flash memory, an operation unit 260 which is, for example, buttons and/or a touch panel for acquiring the operation performed by a user, a display unit 270 which is, for example, a liquid crystal display, and a communication unit 280. The printer 200 is connected to an external apparatus, for example, a terminal device of the user (not shown) so that the communication can be performed by the aid of the communication unit 280.

The volatile storage device 230 provides a buffer area 231 for temporarily storing various intermediate data generated when CPU 210 performs the process. The nonvolatile storage device 220 stores a computer program CP and color evaluation information CI. In this embodiment, the computer program CP is a control program for controlling the printer 200. The color evaluation information CI is the information which is provided together with the computer program CP, and the color evaluation information CI is used in a control judging process as described later on. The computer program CP and the color evaluation information CI may be provided while being stored in the nonvolatile storage device 220 upon the shipping of the printer 200. In place thereof, the computer program CP and the color evaluation information CI may be provided in a form of being downloaded from a server. Alternatively, the computer program CP and the color evaluation information CI may be provided in a form of being stored on DVD-ROM or the like. CPU 210 controls, for example, the printing mechanism 100 by executing the computer program CP to execute the printing process as described later on. The color evaluation information CI will be described later on.

The printing mechanism 100 performs the printing by discharging respective inks (liquid droplets) of cyan (C), magenta (M), yellow (Y), and black (K). The printing mechanism 100 is provided with a printing head 110, a head driver 120, a main-scan section 130, and a conveying unit (conveyor) 140.

Figure 2A:
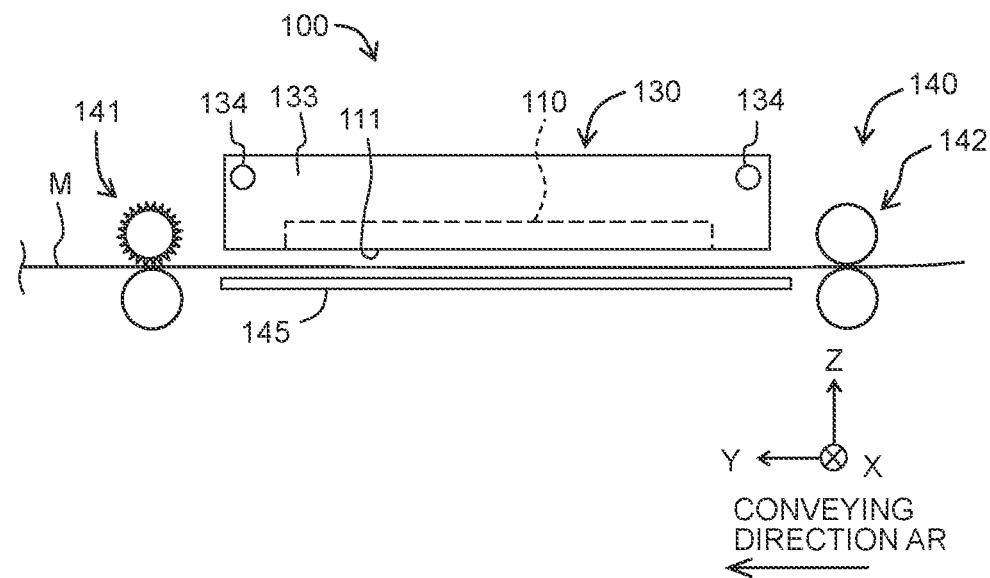
FIGS. 2A and 2B show schematic configuration of a printing mechanism.

As shown in FIG. 2A, the main-scan section 130 is provided with a carriage 133 which carries the printing head 110, and sliding shafts 134 which hold the carriage 133 so that the carriage 133 is reciprocatively movable in the main scanning direction (X axis direction as shown in FIG. 2). The main-scan section 130 reciprocatively moves the carriage 133 along the sliding shafts 134 by using the motive power of an unillustrated main scanning motor. Accordingly, the main scanning is realized, in which the printing head 110 is reciprocatively moved in the main scanning direction with respect to the printing paper M.

Figure 2B:
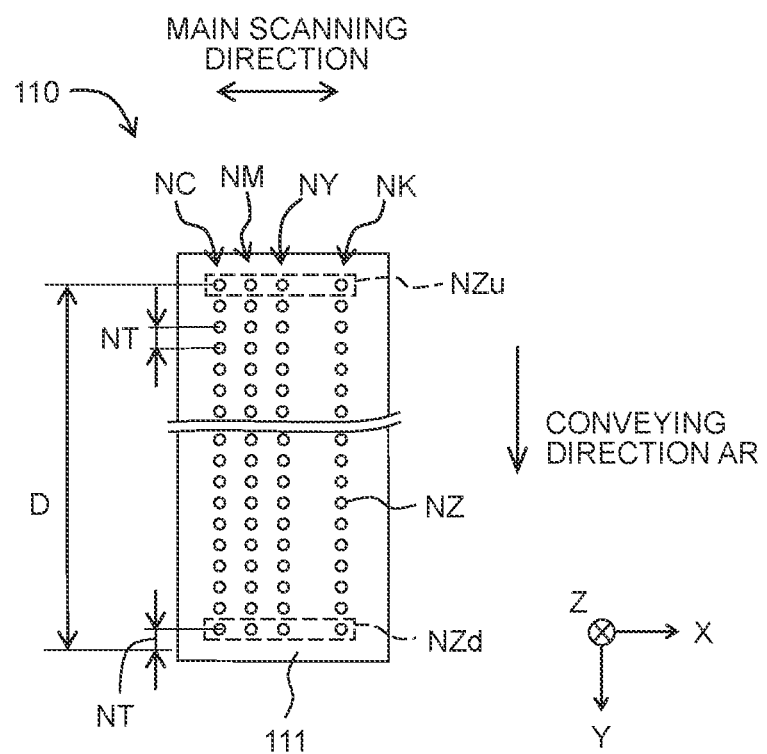

The conveying unit 140 conveys the printing paper M in the conveying direction AR (+Y direction as shown in FIGS. 2A and 2B) intersecting the main scanning direction, while holding the printing paper M. As shown in FIG. 2A, the conveying unit 140 is provided with a printing paper stand 145, an upstream roller pair 142, and a downstream roller pair 141. In the following description, the upstream side (−Y side) in the conveying direction AR is simply referred to as "upstream side" as well, and the downstream side (+Y side) in the conveying direction AR is simply referred to as "downstream side" as well.

The upstream roller pair 142 holds the printing paper M on the upstream side (−Y side) from the printing head 110, and the downstream roller pair 141 holds the printing paper M on the downstream side (+Y side) from the printing head 110. The printing paper stand 145 is arranged at the position opposed to the nozzle-formed surface 111 of the printing head 110, the position being disposed between the upstream roller pair 142 and the downstream roller pair 141. The printing paper M is conveyed by driving the downstream roller pair 141 and the upstream roller pair 142 by means of an unillustrated conveying motor.

The head driver 120 (FIG. 1) drives the printing head 110 by supplying the driving signal to the printing head 110 during the period in which the main scanning of the printing head 110 is performed by the main-scan section 130. The printing head 110 forms the dots by discharging the inks onto the printing paper conveyed by the conveying unit 140 in accordance with the driving signal.

FIG. 2B illustrates the configuration of the printing head 110 as viewed from the −Z side (lower side as viewed in FIG. 2A). As shown in FIG. 2B, a plurality of nozzle arrays composed of a plurality of nozzles, i.e., nozzle arrays NC, NM, NY, NK for discharging the respective inks of C, M, Y, K described above are formed on the nozzle-formed surface 111 of the printing head 110. Each of the nozzle arrays includes the plurality of nozzles NZ which are aligned in the conveying direction AR. The plurality of nozzles NZ have mutually different positions in the conveying direction AR (+Y direction), and the plurality of nozzles NZ are aligned at predetermined nozzle intervals NT in the conveying direction AR. The nozzle interval NT is the length in the conveying direction AR between the two nozzles NZ which are disposed adjacently with each other in the conveying direction AR and which are included in the plurality of nozzles NZ. The nozzle NZ, which is included in the nozzles for constructing each of the nozzle arrays and which is positioned on the most upstream side (−Y side), is referred to as "most upstream nozzle NZu" as well. Further, the nozzle NZ, which is included the nozzles and which is positioned on the most downstream side (+Y side), is referred to as "most downstream nozzle NZd". The length, which is obtained by further adding the nozzle interval NT to the length in the conveying direction AR from the most upstream nozzle NZu to the most downstream nozzle NZd, is referred to as "nozzle length D" as well.

The positions in the main scanning direction (X direction as shown in FIG. 2B) of the nozzle arrays NC, NM, NY, NK are different from each other, and the positions in the conveying direction AR (Y direction as shown in FIG. 2B) are overlapped with each other. For example, in the example shown in FIG. 2B, the nozzle array NM is arranged in the +X direction with respect to the nozzle array NY for discharging the Y ink.

<Printing Process>

Next, the printing process will be explained with reference to FIGS. 3 to 5B. CPU 210 of the printer 200 (FIG. 1) executes the printing process on the basis of a printing instruction from the user. The printing instruction includes the designation of image data to indicate an image to be printed. In S110, CPU 210 acquires the image data designated by the printing instruction from the nonvolatile storage device 220. The image data to be acquired is image data having various formats including, for example, image data subjected to the JPEG compression and image data described by the page description language.

In S120, CPU 210 executes the rasterization process for the acquired image data to generate RGB image data. Accordingly, the RGB image data, which is provided as the object image data of this embodiment, is acquired. The RGB image data is the bitmap data including the RGB value for each of pixels. The RGB value is the color value of the RGB color system including, for example, three component values of red (R), green (G), and blue (B).

In S130, CPU 210 executes the printing data output process by using the RGB image data. The printing data output process is the process in which the partial printing data is generated for every one time of the partial printing SP described later on, and various control data is added to the partial printing data to be outputted to the printing mechanism 100. The control data includes the data for designating the printing direction of the partial printing SP and the data for designating the conveyance amount of the sheet conveyance T to be executed after the partial printing SP. In the printing data output process, the partial printing data is outputted in an amount corresponding to the number of times of the partial printing SP to be executed. Details of the printing data output process will be described later on.

Accordingly, CPU 210 can allow the printing mechanism 100 to print the printing image PI. Specifically, CPU 210 performs the printing by executing the partial printing SP and the sheet conveyance T alternately and repeatedly a plurality of times by controlling the head driver 120, the main-scan section 130, and the conveying unit 140. In one time of the partial printing SP, the inks are discharged onto the printing paper M from the nozzles NZ of the printing head 110, while performing one time of the main scanning in a state in which the printing paper M is allowed to stop on the printing paper stand 145. Thus, a part of the image to be printed is printed on the printing paper M. One time of the sheet conveyance T is the conveyance in which the printing paper M is moved in the conveying direction AR by a predetermined conveyance amount. In this embodiment, CPU 210 allows the printing mechanism 100 to execute m times (m is an integer of not less than 2) of the partial printing SP.

Figure 4:
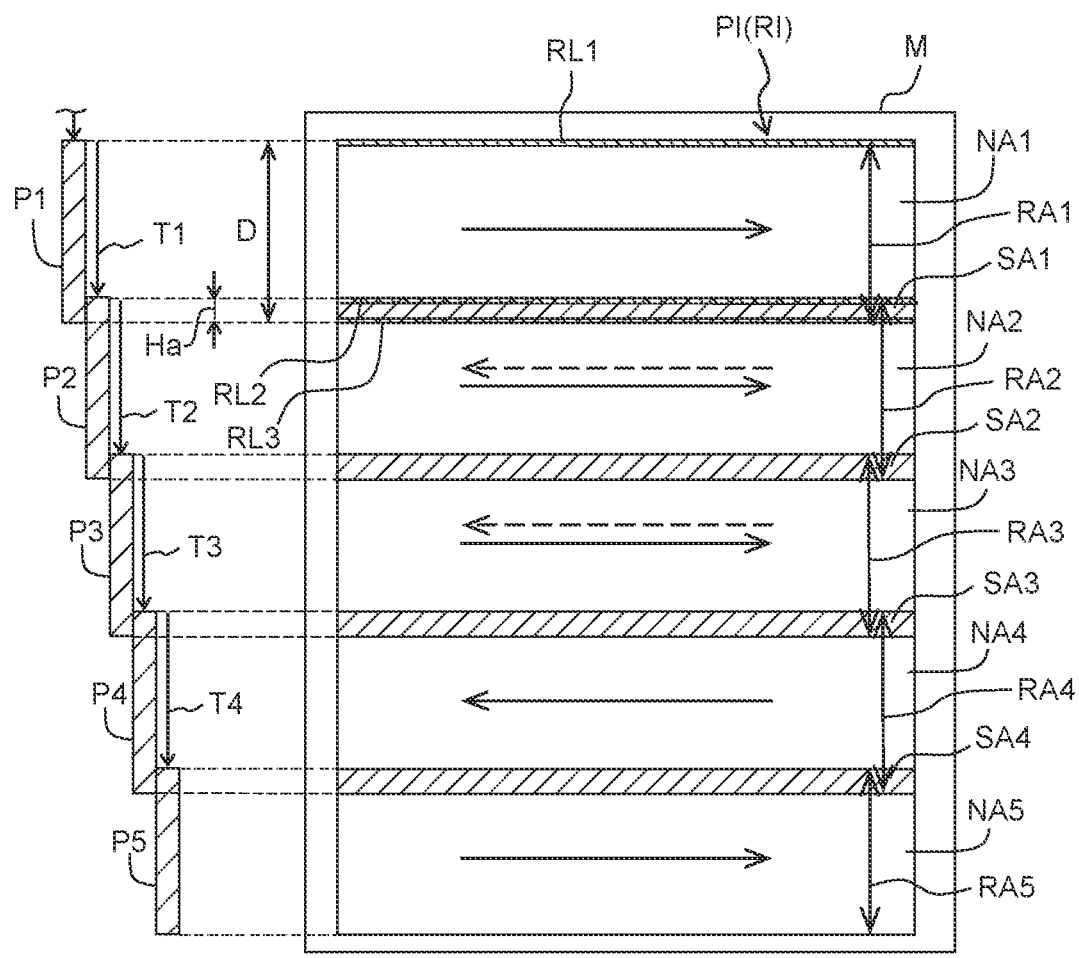
FIG. 4 shows an exemplary printing image to be printed on printing paper.

As shown in FIG. 4, the printing image PI includes a plurality of raster lines RL (for example, RL1 to RL3 shown in FIG. 4) which extend in the X direction (main scanning direction during the printing) and which have mutually different positions in the Y direction. Each of the raster lines RL is a line on which a plurality of dots may be formed in the X direction of FIG. 4. The respective raster lines of the printing image PI correspond one-to-one to the respective raster lines of the RGB image RI as described later on.

In the example shown in FIG. 4, the printing image PI is printed by five times of the partial printing SP (m=5). Further, FIG. 4 shows the head position P, i.e., the relative position in the conveying direction of the printing head 110 with respect to the printing paper M for each time of the partial printing SP (i.e., for each main scanning). A pass number k (k is an integer of not less than 1 and not more than m) is affixed in an order of execution to each of the plurality of times of the partial printing SP. The kth partial printing SP is referred to as "partial printing SPk" as well. Then, the head position P, which is provided when the partial printing SPk is performed, is referred to as "head position Pk". Then, the sheet conveyance T, which is performed between the kth partial printing SPk and the (k+1)th partial printing SP(k+1), is referred to as "kth sheet conveyance Tk" as well. FIG. 4 shows the head positions P1 to P5 and the sheet conveyances T1 to T4 corresponding to the 1st to 5th partial printings SP1 to SP5.

Note that in FIG. 4, the printing image PI, which is formed on the printing paper M, includes a plurality of non-overlap areas NA (for example, unhatched areas NA1 to NA5 shown in FIG. 4) and a plurality of overlap areas SA (for example, hatched areas SA1 to SA4 shown in FIG. 4).

Each of the non-overlap areas NA is such an area that each of the raster lines RL in the area is printed by only one time of the partial printing. For example, the dots are formed by only the kth partial printing SPk, i.e., the partial printing SPk performed at the head position Pk, on each of the raster lines RL of the non-overlap areas NAk shown in FIG. 4. The dots are not formed by the (k+1)th partial printing SP(k+1) or the (k−1)th partial printing SP(k−1) on each of the raster lines RL of the non-overlap areas NAk. Therefore, the dot of the specified color, for example, the dot of C on each of the raster lines RL of the non-overlap areas NAk is formed by using one nozzle which is included in the nozzle array NC and which corresponds to the raster line RL.

The overlap area SA is such an area that the raster line RL in the area is printed by two times of the partial printing. For example, the dots are formed by the kth partial printing SPk and the (k+1)th partial printing SP(k+1) on each of the raster lines RL of the overlap areas SAk shown in FIG. 4. That is, the dots are formed by the partial printing SPk performed at the head position Pk and the partial printing SP(k+1) performed at the head position P(k+1) on each of the raster lines RL of the overlap areas SAk. Therefore, the dot of the specified color, for example, the dot of C on each of the raster lines RL of the overlap areas SAk is formed by using two nozzles which are included in the nozzle array NC and which correspond to the raster line RL. The two nozzles, which correspond to the raster line RL of the overlap area SAk, are the nozzle which corresponds to the raster line RL in the partial printing SPk and the nozzle which corresponds to the raster line RL in the partial printing SP(k+1).

The overlap area SAk is positioned between the non-overlap area NAk and the non-overlap area NA(k+1). The length Ha in the conveying direction of the overlap area SA is, for example, a length corresponding to about several to several tens raster lines RL.

Note that as shown in FIG. 4, the partial area RA1, which can be printed by the first partial printing SP1, includes the overlap area SA1 which includes the upstream end of the partial area RA1 and the non-overlap area NA1 which is disposed on the downstream side from the overlap area SA1. Each of the partial areas RA2 to RA4, which can be printed by the second to fourth partial printings SP2 to SP4, includes the overlap area SAk which includes the upstream end of the partial area RAk, the overlap area SA(k−1) which includes the downstream end of the partial area RAk, and the non-overlap area NAk which is disposed on the downstream side from the overlap area SAk and which is disposed on the upstream side from the overlap area SA(k−1) (k is any one of 2 to 4). The partial area RA5, which can be printed by the last partial printing SP5, includes the overlap area SA4 which includes the downstream end of the partial area RA5 and the non-overlap area NA5 which is disposed on the upstream side from the overlap area SA4.

The reason, why the overlap area SA is provided, will be explained. It is assumed that the printing image is constructed by only the image printed on the non-overlap area without providing the overlap area SA. In this case, an inconvenience, which is referred to as so-called "banding", may occur, in which a white stripe or a black stripe appears at the boundary between the two non-overlap areas that are adjacent to one another in the conveying direction AR, on account of, for example, the dispersion of the conveyance amount of the printing paper M. The banding deteriorates the image quality of the printing image PI. The inconvenience called "banding" described above can be suppressed by printing the image in the areas by providing the overlap area SA between the two non-overlap areas, for the following reason. That is, in the overlap area SA, the dots on one raster line RL are formed by two times of the partial printing. Therefore, it is possible to suppress all of the dots disposed on one raster line RL from being deviated identically with respect to all of the dots disposed on another raster line.

The direction of the main scanning in each of the partial printings SP (referred to as "printing direction" as well) is any one of the outward direction and the homeward direction. That is, the partial printing SP is any one of the outward printing in which the dots are formed while performing the main scanning in the outward direction (+X direction in FIG. 4) and the homeward printing in which the dots are formed while performing the main scanning in the homeward direction (−X direction in FIG. 4). In FIG. 4, solid line arrows are affixed in the +X direction or the −X direction in the partial areas RA. The images of the partial areas RA1, RA2, RA3, RA5 affixed with the solid line arrows in the +X direction are printed by the outward printing. The image of the partial area RA4 affixed with the solid line arrow in the −X direction is printed by the homeward printing.

In this context, as shown in FIG. 2B, the nozzle arrays NC, NM, NY, NK of CMYK of the printing head 110 have mutually different positions in the main scanning direction. On this account, when the respective dots of CMYK are formed at the same position on the printing paper M, the order of formation of the dots differs between the outward printing and the homeward printing. For example, in the example shown in FIG. 2B, the dots are formed in an order of K, Y, M, C in the outward printing, and the dots are conversely formed in an order of C, M, Y, K in the homeward printing. As a result, the order of overlap of the dots differs between the image which is printed by the outward printing and the image which is printed by the homeward printing, in the area in which the dots of a plurality of colors are overlapped with each other. On this account, the printed color tone mutually differs in some cases between the image which is printed by the outward printing and the image which is printed by the homeward printing, even when the printing is mutually performed by using the same dot data. The color difference, which is generated between the image which is printed by the outward printing and the image which is printed by the homeward printing as described above, is referred to as "color difference between the outward printing and the homeward printing" as well.

The degree of the color difference between the outward printing and the homeward printing differs depending on the color to be printed. The color evaluation information CI described above (FIG. 1) is the information in which the weight in conformity with the color difference between the outward printing and the homeward printing is designated for each of the RGB values.

Figures 5A, 5B:
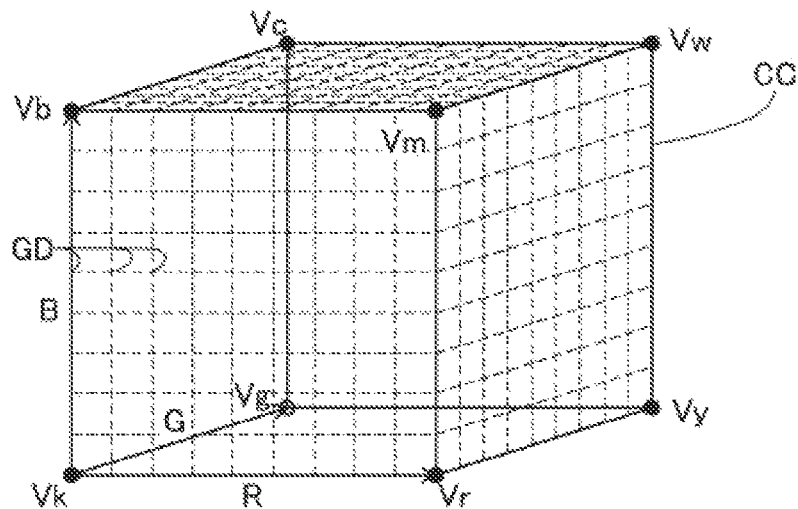
FIGS. 5A and 5B explain color evaluation information CI.

The color evaluation information CI will be explained with reference to FIGS. 5A and 5B. As shown in FIG. 5A, signs to indicate colors are affixed to eight apexes of the RGB color space CC respectively (specifically, black apex Vk (0, 0, 0), red apex Vr (255, 0, 0), green apex Vg (0, 255, 0), blue apex Vb (0, 0, 255), cyan apex Vc (0, 255, 255), magenta apex Vm (255, 0, 255), yellow apex Vy (255, 255, 0), white apex Vw (255, 255, 255)). The numerals in the parentheses indicate the values of the respective color components of (R, G, B). The value of R of each of the grids GD is any one of (Q+1) values obtained by equally dividing the range of R (zero to 255 in this case) by Q. The respective values of the green G and the blue B of the respective grids GD are obtained in the same manner as described above. In this embodiment, Q=9 is given. Therefore, a number of the cube of 9 (729) of grids GD are set in the RGB color space CC.

As shown in FIG. 5B, in the color evaluation information CI, the weight Wt is allowed to correspond to each of the RGB values corresponding to the 729 grids GD. For example, an evaluator prints a color patch to indicate the RGB value by means of both of the outward printing and the homeward printing on the basis of the CMYK value obtained by color-converting the RGB value of the specified grid GD. The evaluator obtains the colorimetry value (for example, the color value of the CIELAB color space (referred to as "Lab value" as well)) by measuring the colors of two color patches. The evaluator calculates the color difference between the obtained two colorimetry values as the color difference dM between the outward printing and the homeward printing corresponding to the specified grid GD. The evaluator determines the weight Wt which is allowed to correspond to the specified grid GD so that the larger the color difference dM between the outward printing and the homeward printing is, the larger the weight Wt is. In this way, the weights Wt, which are allowed to correspond to the 729 grids GD, are determined, and the color evaluation information CI is prepared. For example, the color, which is expressed by using the two types of inks, has the large color difference between the outward printing and the homeward printing as compared with the color which is expressed by using the one type of ink. Therefore, the weight Wt, which is allowed to correspond to the grid GD corresponding to the color expressed by using the two types of inks, is larger than that allowed to correspond to the grid GD corresponding to the color expressed by using the one type of ink.

In this embodiment, the printing direction of each of the partial printings SP is determined by using the color evaluation information CI. Details of the determination of the printing direction of the partial printing SP will be described later on.

<Printing Data Output Process>

Next, the printing data output process of S130 shown in FIG. 3 will be explained with reference to FIG. 6. As described above, the printing data output process is such a process that the partial printing data is generated for each of the partial printings SP by using the RGB image data, and various control data is added to the partial printing data to be outputted to the printing mechanism 100.

The RGB image RI, which is designated by the RGB image data as the object of the printing data output process, corresponds to the printing image PI shown in FIG. 4. On this account, it can be also affirmed that Fig. shows the RGB image RI. The RGB image RI includes the plurality of raster lines RL (for example, RL1 shown in FIG. 4) which extend in the X direction shown in FIG. 4 (direction corresponding to the main scanning direction during the printing) and which have mutually different positions in the Y direction. Each of the raster lines RL is the line extending in the X direction in FIG. 4, and the line is composed of a plurality of pixels. Each of the raster lines RL of the printing image PI on which the dots are formed corresponds one-to-one to each of the raster lines of the RGB image RI composed of the pixels as described above. On this account, in the present description and the drawings, the same signs are affixed to the raster lines of the printing image PI and the raster lines of the RGB image RI. Further, in the RGB image RI, the areas, which correspond to the overlap area SA, the non-overlap area NA, and the partial area RA of the printing image PI described above, are referred to as the overlap area SA, the non-overlap area NA, and the partial area RA of the RGB image RI. In the RGB image RI, the direction, which corresponds to the conveying direction AR of the printing image PI, is referred to as the conveying direction AR in the RGB image RI.

In S200, for example, CPU 210 successively selects one target raster line from the plurality of raster lines RL of the RGB image RI, as starting from the downstream side (+Y side shown in FIG. 4) in the conveying direction AR during the printing. For example, the first target raster line is the raster line RL1 shown in FIG. 4.

In this context, the partial printing SP, which prints the target raster line, is referred to as "target partial printing" as well. However, if the target raster line is printed by two times of the partial printing SP, i.e., if the target raster line is positioned within the overlap area SA, the partial printing of the two times of the partial printing, which is performed formerly, is designated as the target partial printing. For example, the raster lines RL1 to RL3 shown in FIG. 4 are the target raster lines, the target partial printing is the partial printing SP1 performed at the head position P1 (FIG. 4).

In S210, CPU 210 judges whether or not the target raster line is positioned within the overlap area SA. For example, if the raster lines RL2, RL3 shown in FIG. 4 are the target raster lines, it is judged that the target raster line is positioned within the overlap area SA.

If the target raster line is not positioned within the overlap area SA (S210: NO), i.e., if the target raster line is positioned within the non-overlap area NA, then CPU 210 executes the dot data generating process for the non-overlap area in S222 and S224.

In S222, CPU 210 executes the color conversion process for the data corresponding to the target raster line of the RGB image data. The color conversion process is the process in which the RGB values of the plurality of pixels for constructing the target raster line are converted into the CMYK values. The CMYK value is the color value of the CMYK color system including the component values (component values of C, M, Y, K in this embodiment) corresponding to the inks to be used for the printing. The color conversion process is executed, for example, by making reference to a known look-up table for defining the corresponding relationship between the RGB value and the CMYK value.

In S224, CPU 210 executes the half tone process for the data corresponding to the target raster line having been subjected to the color conversion process. Accordingly, the dot data, which corresponds to the target raster line, is generated. The dot data is the data which represents the dot formation state for each of the pixels in relation to each of the color components of CMYK. The value of each of the pixels of the dot data represents the formation state of the dots of, for example, two gradations of "no dot" and "with dot" or four gradations of "no dot", "small", "middle", "large". The half tone process is executed by using a known technique including, for example, the dither method (dithering) and the error diffusion method.

If the target raster line is not positioned within the overlap area SA, all of the dots, which correspond to the plurality of pixels included in the target raster line, should be formed by the target partial printing. On this account, in S225, CPU 210 stores, in the output buffer, the dot data of the target raster line having been already generated.

If the target raster line is positioned within the overlap area SA (S210: YES), CPU 210 judges, in S211, whether or not the target raster line is the raster line disposed at the head of the overlap area SA. The raster line disposed at the head of the overlap area SA is the raster line which is included in the plurality of raster lines included in the overlap area SA and which is positioned at the downstream end in the conveying direction AR (upper end in FIG. 4). For example, the raster line RL2 shown in FIG. 4 is the raster line disposed at the head of the overlap area SA1.

If the target raster line is the raster line disposed at the head of the overlap area SA (S211: YES), CPU 210 executes the control judging process in S212. The control judging process is the process in which the printing direction of the partial printing next to the target partial printing is determined to be any one of the outward direction (+X direction in FIG. 4) and the homeward direction (−X direction in FIG. 4), and the density correction amount is determined for the overlap area SA in which the target raster line is positioned at the head. The density correction amount, which is determined in this process, is used to perform the correction for lowering the density of the image of the overlap area SA in the dot data generating process for the overlap area described later on. If the target raster line is not the raster line disposed at the head of the overlap area SA (S211: NO), the control judging process in S212 is skipped.

The control judging process will be explained with reference to FIG. 7. In S300, CPU 210 sets a plurality of blocks BLs in the partial area RA in which the target raster line is positioned at the head, i.e., the partial area RA which can be printed by the partial printing next to the target partial printing. FIG. 8 shows an enlarged view illustrating those disposed in the vicinity of the overlap area SA1 of the RGB image RI. If the target raster line is the raster line RL2 (FIGS. 4 and 8) which is positioned at the head of the overlap area SA1 and the partial area RA2, then the partial area RA, which can be printed by the target partial printing, is the partial area RA1, and the partial area RA, which can be printed by the next partial printing, is the partial area RA2. On this account, in this case, as shown in FIG. 8, the plurality of blocks BLs are set in the partial area RA2. For example, in the example shown in FIG. 8, the ten blocks BLs, which are aligned in the main scanning direction (X direction), are set in a plurality of rows in the partial area RA2. The height BH in the conveying direction and the width BW in the main scanning direction of each of the blocks BLs are previously determined.

In S305, CPU 210 calculates the evaluation values EV of the images of the respective blocks BLs of the RGB image RI. Specifically, the weights Wt, which correspond to the plurality of pixels in the target block BLs respectively, are determined. The weight Wt is determined by making reference to the color evaluation information CI described above (FIG. 5). That is, the weights Wt, which correspond to the respective pixels, are calculated by performing the interpolation calculation on the basis of the weights Wt corresponding to the plurality of grids GD which are close to the RGB values of the respective pixels. An average value of the plurality of weights Wt corresponding to the plurality of pixels is calculated as the evaluation value EV of the target block BLs. The large evaluation value EV of the target block BLs means the large color difference between the outward printing and the homeward printing of the image of the target block BLs.

In S310, CPU 210 counts the number Q of the blocks BLs in which the evaluation value EV is not less than a predetermined threshold value TH1. In S315, CPU 210 judges whether or not the number Q is not less than a threshold value TH2.

If the number Q is not less than the threshold value TH2 (S315: YES), CPU 210 determines the printing direction of the next partial printing to be the outward direction in S320. In this case, if the printing direction of the next partial printing is the homeward direction, then the color difference between the outward printing and the homeward printing of the image to be printed by the next partial printing is increased, and the image quality may be deteriorated, as compared with a case in which the printing direction of the next partial printing is the outward direction.

If the number Q is less than the threshold value TH2 (S315: NO), CPU 210 determines the printing direction of the next partial printing to be the direction opposite to the printing direction of the target partial printing in S325. In this case, even if the printing direction of the next partial printing is the homeward direction, then the color difference between the outward printing and the homeward printing of the image to be printed by the next partial printing is not increased, and the image quality is hardly deteriorated, as compared with a case in which the printing direction of the next partial printing is the outward direction. On this account, in this case, the priority is given to the suppression of the decrease in the printing speed.

In S330, CPU 210 judges whether the printing direction of the target partial printing and the printing direction of the next partial printing are the opposite directions or the same direction. If the printing direction of the target partial printing and the printing direction of the next partial printing are the opposite directions (S330: YES), CPU 210 determines the density correction amount to be ΔV1 in S335. If the printing direction of the target partial printing and the printing direction of the next partial printing are the same direction (S330: NO), CPU 210 determines the density correction amount to be ΔV2 which is larger than ΔV1, in S340. The density correction amounts ΔV1, ΔV2 to be determined are used when the density of the image in the overlap area SA is lowered in the dot data generating process for the overlap area described later on. The density correction amounts ΔV1, ΔV2 are the values which are, for example, larger than 0 and less than 1, and the values indicate, for example, the rates to decrease the density. The larger the correction amount is, the larger the degree to lower the density of the image is. If the density correction amount is determined, the control judging process is terminated.

Figure 6:
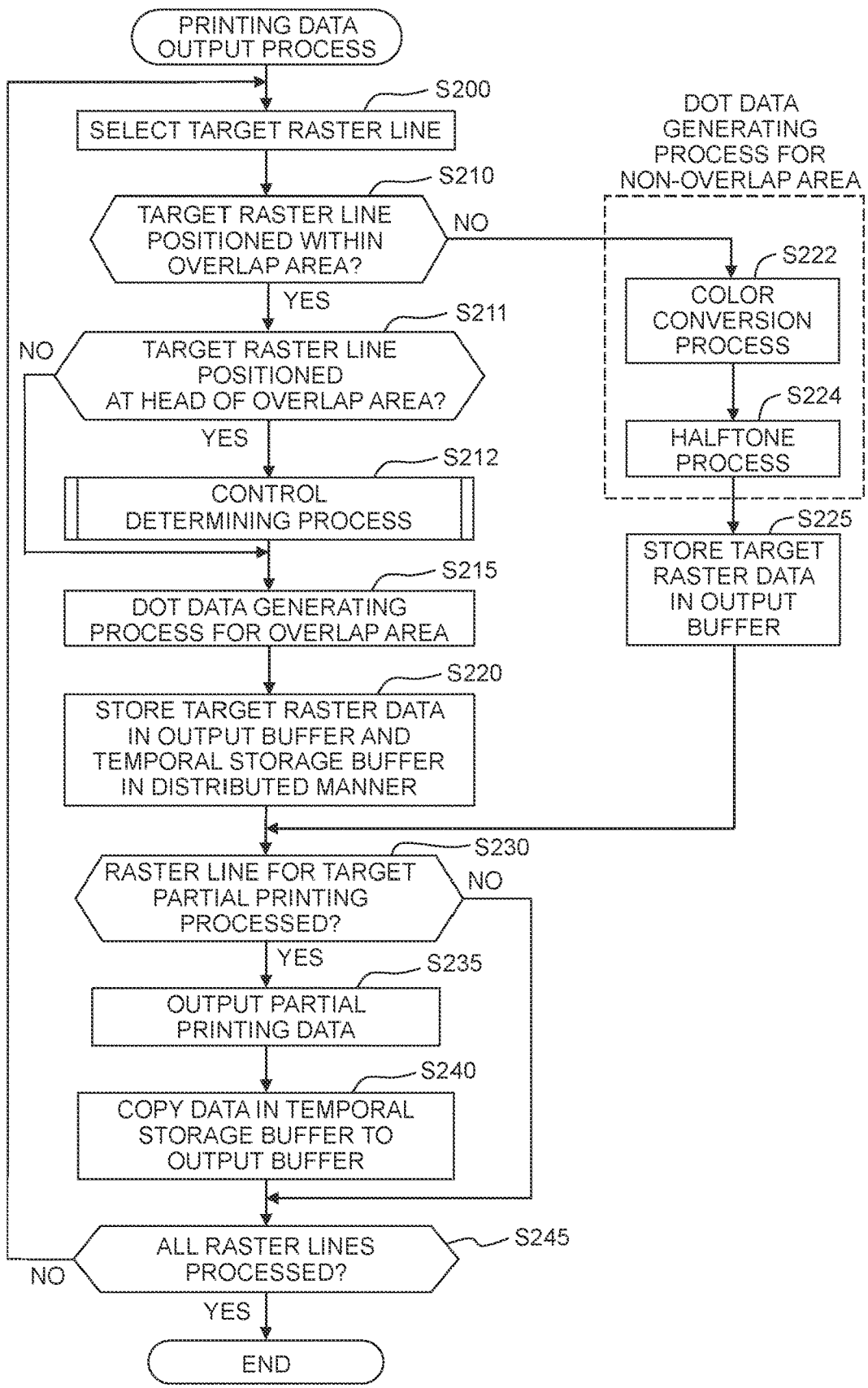
FIG. 6 shows a flow chart of a printing data output process according to the first embodiment.
Figure 9:
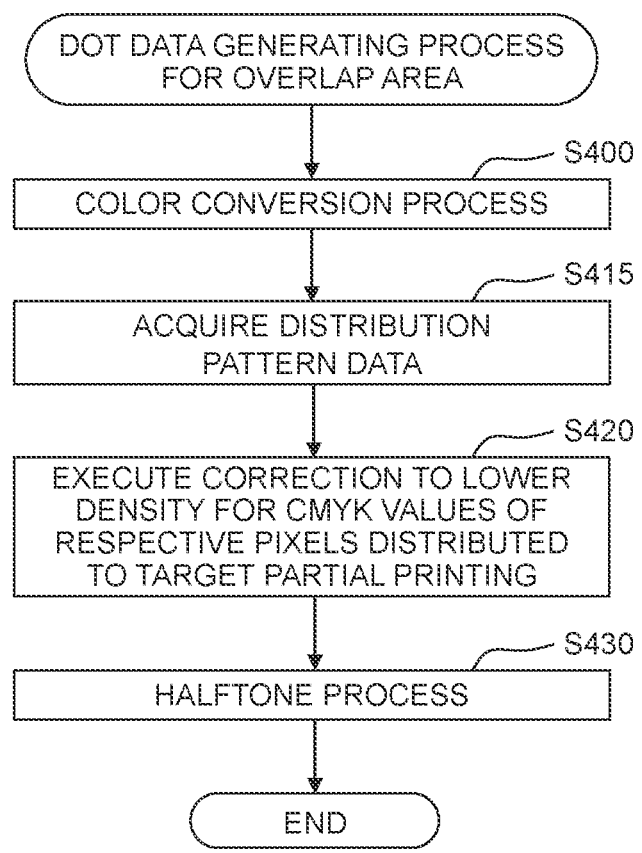
FIG. 9 shows a flow chart illustrating a dot data generating process for the overlap area according to the first embodiment.

In S215 shown in FIG. 6, CPU 210 executes the dot data generating process for the overlap area shown in FIG. 9.

In S400 shown in FIG. 9, CPU 210 executes the color conversion process for the data corresponding to the target raster line of the RGB image data. Accordingly, the values of the plurality of pixels for constructing the target raster line are converted from the RGB values to the CMYK values.

Figure 10A:
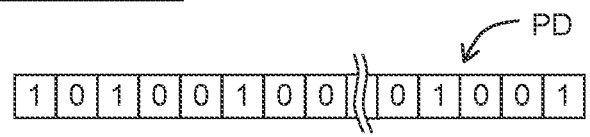
FIG. 10A shows distribution pattern data.

In S415, CPU 210 acquires the distribution pattern data PD corresponding to the target raster line. As shown in FIG. 10A, the distribution pattern data PD is binary data having values corresponding the respective pixels of the target raster line. The value "0" of the distribution pattern data PD indicates that the dot corresponding to the pixel is to be formed by the target partial printing. The value "1" of the distribution pattern data PD indicates that the dot corresponding to the pixel is to be formed by the partial printing next to the target partial printing.

Figure 10B:
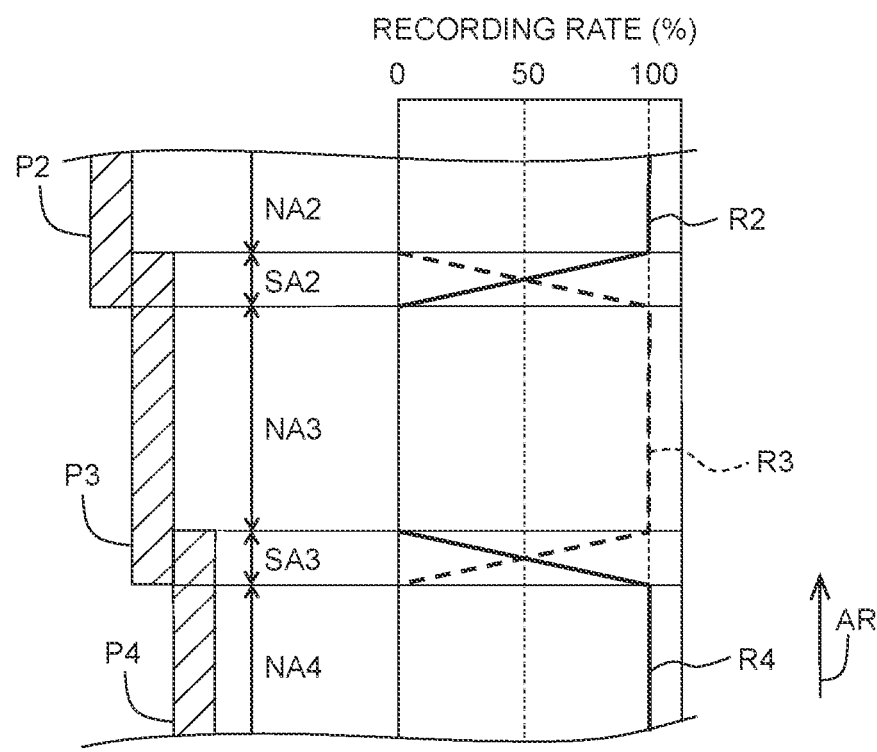
FIG. 10B shows recording rates of partial printing at different head positions.

In this context, the recording rates R2, R3, R4 shown in FIG. 10B are the recording rates in the partial printings SP2, SP3, SP4 at the head positions P2, P3, P4 respectively. In FIG. 10B, the respective recording rates R2, R3, R4 are shown with respect to the positions in the conveying direction AR. The recording rate R2 is 100% in the range in the conveying direction AR corresponding to the non-overlap area NA2 (FIG. 4). Similarly, the recording rates R3, R4 are 100% in the ranges in the conveying direction AR corresponding to the non-overlap areas NA3, NA4 (FIG. 4).

The recording rate R2 is decreased linearly at positions disposed nearer to the upstream side in the conveying direction AR (lower side as viewed in FIG. 10B) in the range in the conveying direction AR corresponding to the overlap area SA2 (FIG. 4). The recording rate R3 is decreased linearly at positions disposed nearer to the downstream side in the conveying direction AR (upper side as viewed in FIG. 10B) in the range in the conveying direction AR corresponding to the overlap area SA2. The sum of the recording rate R2 and the recording rate R3 is 100% in the range in the conveying direction AR corresponding to the overlap area SA2 (FIG. 4). The recording rates R3, R4 are also provided in the same manner as described above in the range in the conveying direction AR corresponding to the overlap area SA3 (FIG. 4).

Note that in FIG. 10B, the recording rates are referred to in relation to only the partial printings at the head positions P2 to P4. However, the recording rates are also provided in the same manner as described above in relation to other head positions P1, P5. Accordingly, the printing can be performed at the recording rates of 100% in the non-overlap areas NA1 to NA5 and the overlap areas SA1 to SA4 respectively.

The distribution pattern data PD is generated so that the recording rates are realized as described above in conformity with the positions in the conveying direction AR in the overlap area SA.

In S420 shown in FIG. 9, CPU 210 executes the correction to lower the density for the CMYK values of the respective pixels distributed to the target partial printing of the plurality of pixels for constructing the target raster line. Specifically, the respective corrected component values are the values obtained by multiplying the respective component values of C, M, Y, K by a coefficient α. The coefficient α is the coefficient based on the density correction amount ΔV (ΔV1 or ΔV2) determined in the control judging process described above. In this embodiment, α=(1−ΔV) is given. As described above, the pixel, which is distributed to the target partial printing, is the pixel corresponding to the value "0" of the distribution pattern data PD. Therefore, the pixel is specified by making reference to the distribution pattern data PD. Note that in this embodiment, the correction to lower the density is not executed for the pixel distributed to the next target partial printing (pixel corresponding to the value "1" of the distribution pattern data PD).

In S430, CPU 210 executes the half tone process for the CMYK values of the plurality of pixels for constructing the target raster line. Accordingly, the dot data of the target raster line is generated. If the dot data of the target raster line is generated, the dot data generating process for the overlap area is terminated.

In S220 shown in FIG. 6, CPU 210 stores the dot data of the target raster line in a distributed manner in the output buffer and the temporal storage buffer in accordance with the distribution pattern data PD. That is, the data, which is included in the dot data of the target raster line and which indicates the dots to be formed by the target partial printing, is stored in the output buffer. The data, which indicates the dots to be formed by the partial printing next to the target partial printing, is stored in the temporal storage buffer.

In S230, CPU 210 judges whether or not all of the raster lines of the target partial printing have been processed as the target raster lines. For example, when the partial printing SP1, which is performed at the head position P1 shown in FIG. 4, is the target partial printing, if the raster line RL3, which is included in the plurality of raster lines RL corresponding to the head position P1 and which is positioned at the most upstream position in the conveying direction AR, is the target raster line, then it is judged that all of the raster lines corresponding to the target partial printing have been processed.

If all of the raster lines of the target partial printing have been processed (S230: YES), the dot data of the target partial printing is stored in the output buffer at this point in time. Therefore, in this case, in S235, CPU 210 outputs the dot data of the target partial printing as the partial printing data to the printing mechanism 100. In this procedure, the control data, which indicates the printing direction of the target partial printing and the conveyance amount of the sheet conveyance T to be performed after the target partial printing, is added to the partial printing data to be outputted. For example, it is assumed that the target partial printing is the first partial printing SP1. In this case, the length in the conveying direction AR of the overlap area SA1 disposed on the upstream side of the partial area RA1 to be printed by the partial printing SP1 is Ha (FIG. 4). Therefore, the conveyance amount of the sheet conveyance T to be performed after the target partial printing has the value (D−Ha) obtained by subtracting Ha from the nozzle length D.

In S240, CPU 210 erases the outputted partial printing data from the output buffer, and the data stored in the temporal storage buffer is copied to the output buffer. For example, the raster line, which is included in the plurality of raster lines corresponding to the head position P2 and which is disposed within the overlap area SA1, has been already processed at the point in time at which the last raster line corresponding to the head position P1 shown in FIG. 4 has been processed. Then, the data, which is included in the raster data corresponding to the processed raster line as described above and which is used in the partial printing SP2 performed at the head position P2, has been already stored in the temporal storage buffer. In this step, the data is copied to the output buffer.

If any unprocessed raster line is present in the target partial printing (S230: NO), CPU 210 skips S235 and S240.

In S245, CPU 210 judges whether or not all of the raster lines in the RGB image RI have been processed as the target raster lines. If any unprocessed raster line is present (S245: NO), CPU 210 returns to S200 to select the unprocessed raster line as the target raster line. If all of the raster lines have been processed (S245: YES), CPU 210 terminates the printing data output process.

Figure 7:
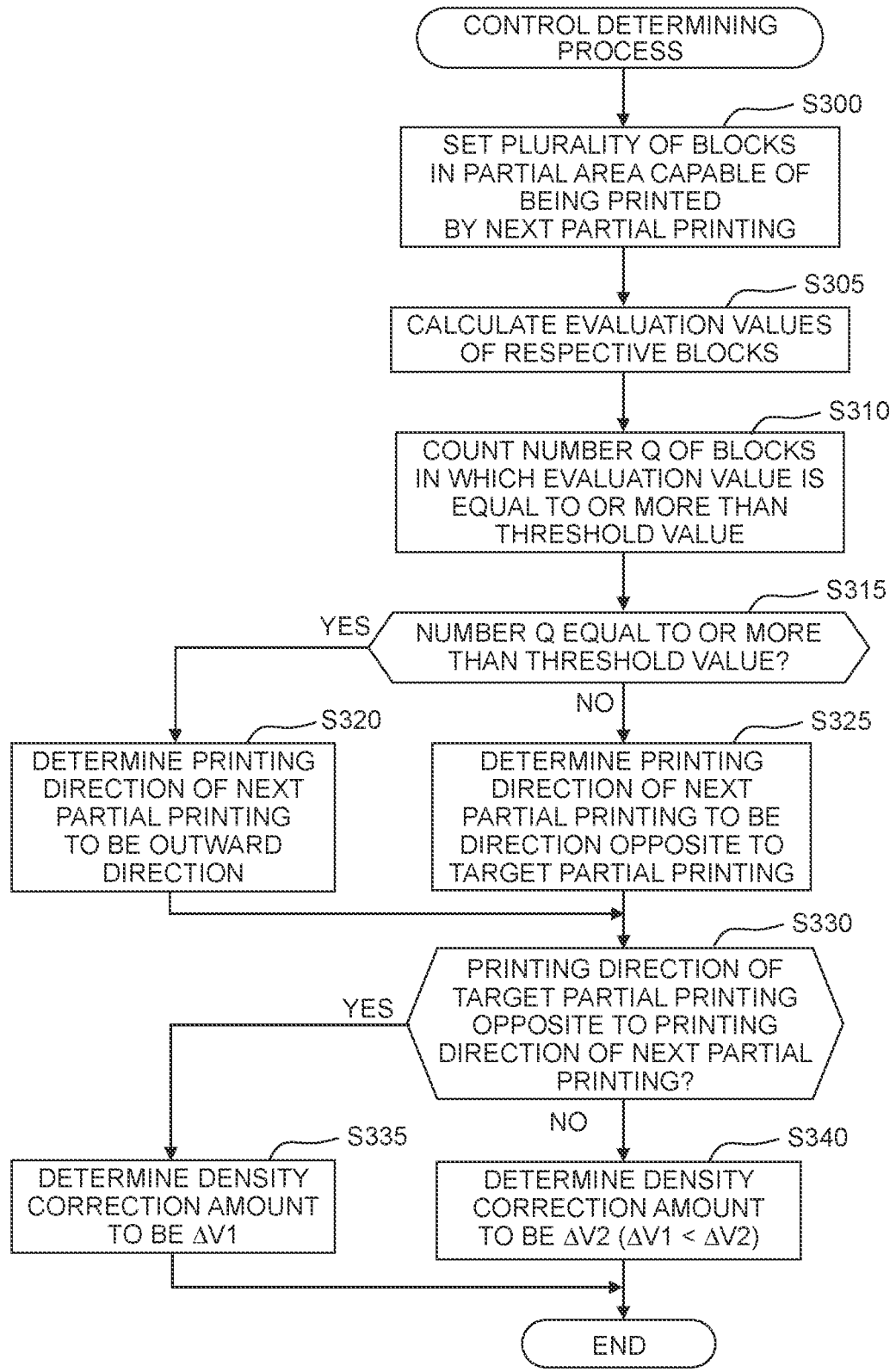
FIG. 7 shows a flow chart of a control judging process.
Figure 8:
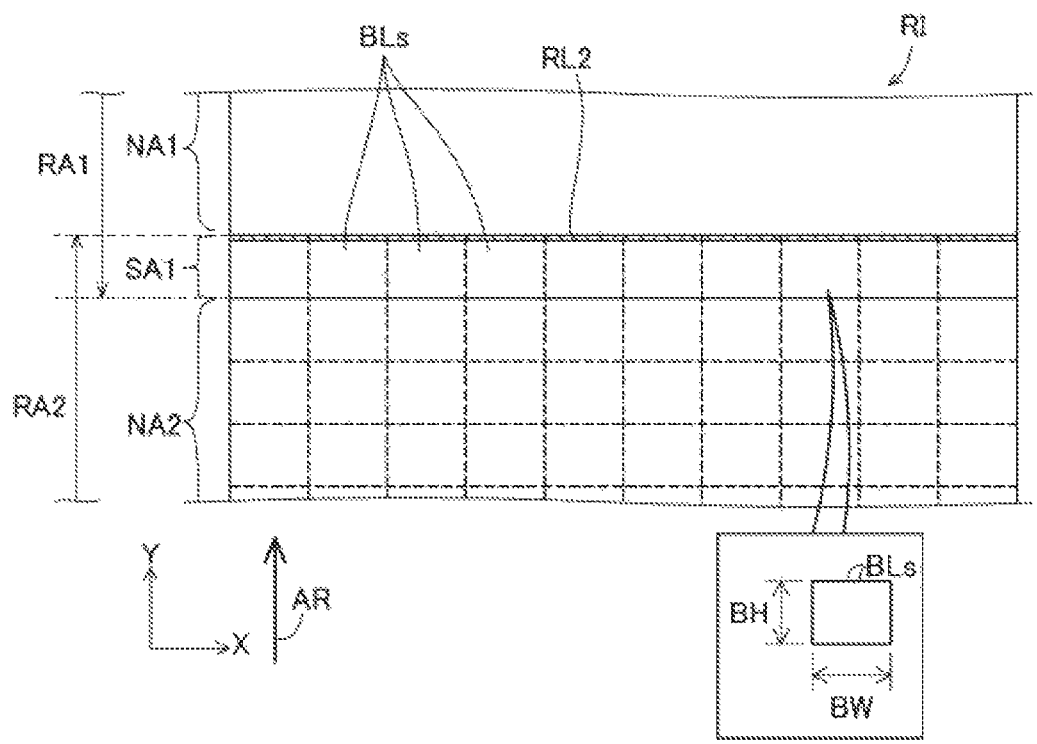
FIG. 8 shows an enlarged view illustrating those disposed in the vicinity of an overlap area of an RGB image RI.

In the printing process explained above, if it is judged in the control judging process shown in FIG. 7 that the color difference between the outward printing and the homeward printing of the image of the partial area RA is not less than the reference, specifically, if the number Q of the blocks BLs in which the evaluation value EV is not less than the threshold value TH1 is not less than the threshold value TH2 (S315: YES), then the image of the partial area RA is always printed in the outward direction (S320). Then, if it is judged that the color difference between the outward printing and the homeward printing of the image of the partial area RA is less than the reference, specifically, if the number Q is less than the threshold value TH2 (S315: NO), then the image of the partial area RA is printed in the printing direction opposite to the printing direction of the partial printing performed just before (S325).

For example, in the example shown in FIG. 4, the images of the partial areas RA2, RA3 are the images for which it is judged that the color difference between the outward printing and the homeward printing is not less than the reference, and the images of the remaining partial areas RA1, RA4, RA5 are the images for which it is judged that the color difference between the outward printing and the homeward printing is less than the reference. As shown in FIG. 4, the partial printings, which print the images of the partial areas RA2, RA3, are performed in the same printing direction as that of the partial printing performed just before. In this case, as shown by broken line arrows in FIG. 4, the main scanning is performed without forming the dot between the partial printing and the partial printing performed just before. The main scanning, which is performed without forming the dot as described above, is referred to as "main scanning with no printing" as well.

When the main scanning with no printing is performed, the printing time required for the printing is prolonged as compared with when the main scanning with no printing is not performed. However, it is possible to suppress the deterioration of the image quality of the printing image by suppressing any conspicuous color difference between the outward printing and the homeward printing as described above.

On the other hand, the color difference between the outward printing and the homeward printing is not conspicuous for the images of the partial areas RA4, RA5 for which it is judged that the color difference between the outward printing and the homeward printing is less than the reference. On this account, the partial printing, by which these images are printed, is performed by using, as the printing direction, the direction opposite to that of the partial printing performed just before so that the execution of the main scanning with no printing is not required. In this case, the main scanning with no printing is not performed, and hence it is possible to improve the printing speed.

Further, according to this embodiment, CPU 210 acquires the RGB image data as the object image data (S110 shown in FIG. 3), and CPU 210 generates the dot data by using the RGB image data (S222, S224, S215 shown in FIG. 6). CPU 210 prints the printing image PI by allowing the printing mechanism 100 to execute the discharge of the inks and the conveyance of the printing paper M by using the dot data (S235 shown in FIG. 6). As explained with reference to FIG. 4, the dots of the specified color (for example, dot of C) for constructing each of the plurality of raster lines RL included in the non-overlap area NA of the printing image PI are formed by one nozzle corresponding to the raster line RL. The dots of the plurality of specified colors for constructing each of the plurality of raster lines RL included in the overlap area SA of the printing image PI are formed by two or more nozzles corresponding to the raster line RL.

CPU 210 executes the dot data generating process for the non-overlap area (S222, S224 shown in FIG. 6) for the partial image data corresponding to the non-overlap area NA of the RGB image data. Accordingly, CPU 210 generates the dot data corresponding to the non-overlap area NA of the dot data to indicate the printing image PI. CPU 210 executes the dot data generating process for the overlap area (S215 shown in FIG. 6, FIG. 9) for the partial image data corresponding to the overlap area SA of the RGB image data. Accordingly, CPU 210 generates the dot data corresponding to the overlap area SA of the dot data to indicate the printing image PI. In the dot data generating process for the overlap area, the correction is executed to lower the density in S420 shown in FIG. 9. Therefore, it is possible to state that the dot data generating process for the overlap area is the process to generate the dot data corresponding to the overlap area SA so that the image of the overlap area SA is printed at the density which is not more than the density to be provided if the dot data generating process for the non-overlap area is executed for the partial image data corresponding to the overlap area SA.

The reason, why the correction to lower the density of the image of the overlap area SA (S420 shown in FIG. 9) is executed in the dot data generating process for the overlap area (FIG. 9), will now be explained. In the overlap area SA in which the plurality of dots of the specified color (for example, the dots of C) on one raster line RL are formed by two or more nozzles, there is any time lag until the dot is formed by the second nozzle after the dot is formed by the first nozzle of the two or more nozzles. On this account, the dot, which is formed by the first nozzle, spreads on the printing paper M, and then the dot is formed by the second nozzle so that the latter dot is overlapped with the former dot. On this account, the total area of the dot in the overlap area SA tends to be larger than the total area of the dot in the non-overlap area NA. On this account, even when the images are printed by using the same image data, the density of the image printed in the overlap area SA tends to be higher than the density of the image printed in the non-overlap area NA. Due to this fact, any color irregularity may occur between the overlap area SA and the non-overlap area NA in the printing image PI. On this account, the correction (S420 shown in FIG. 9) is executed to lower the density of the image in the overlap area SA of the RGB image RI. As a result, it is possible to suppress the occurrence of the color irregularity between the overlap area SA and the non-overlap area NA by suppressing the occurrence of the difference in the density between the overlap area SA and the non-overlap area NA in the printing image PI.

In this context, the time lag described above, i.e., the interval, which is provided between the formation timing of the dot of the specified color based on the use of the first nozzle on the raster line in the overlap area SA and the formation timing of the dot of the specified color based on the use of the second nozzle, is referred to as "dot formation interval". The longer the dot formation interval is, the larger the degree of increase in the density of the image printed in the overlap area SA is. On this account, in order to appropriately suppress the occurrence of the color irregularity between the overlap area SA and the non-overlap area NA on the printing image PI, it is preferable that the longer the dot formation interval is, the larger the degree to lower the density of the image of the overlap area SA in the RGB image RI is.

According to this embodiment described above, CPU 210 determines the degree to lower the density of the image of the overlap area SA in the dot data generating process for the overlap area, i.e., the correction level (specifically the density correction amounts ΔV1, ΔV2), on the basis of the dot formation interval (S300 to S340 shown in FIG. 7). As a result, it is possible to print the image of the overlap area SA at the appropriate density in conformity with the dot formation interval. Therefore, it is possible to effectively suppress the color irregularity generated between the overlap area SA and the non-overlap area, in conformity with the dot formation interval.

For example, according to this embodiment, CPU 210 determines the correction level on the basis of the dot formation interval predicted by using the data corresponding to the partial printing next to the target partial printing (for example, the data to indicate the image of the partial area RA2 shown in FIG. 7) of the object image data (RGB image data) (S300 to S340 shown in FIG. 7). Therefore, it is possible to effectively suppress the color irregularity generated between the overlap area SA and the non-overlap area NA in conformity with the dot formation interval predicted by using the object image data.

More specifically, CPU 210 determines whether the printing direction of the next partial printing is the opposite direction opposite to the printing direction of the target partial printing or the same direction as the printing direction of the target partial printing by using the data corresponding to the next partial printing of the object image data (S300 to S325 shown in FIG. 7). It is possible to predict the dot formation interval between the target partial printing and the next partial printing on the basis of the printing direction of the next partial printing. That is, when the target partial printing and the next partial printing are performed in the same printing direction, the main scanning with no printing is performed between the target partial printing and the next partial printing as described above. On this account, the dot formation interval is prolonged as compared with when the printing direction of the target partial printing is opposite to the printing direction of the next partial printing. On this account, if the printing direction of the next partial printing is determined to be the opposite direction opposite to the printing direction of the target partial printing (YES in S330 shown in FIG. 7), CPU 210 determines the correction level to be the first correction level (density correction amount: $\Delta V1$) (S335 shown in FIG. 7). On the other hand, if the printing direction of the next partial printing is determined to be the same direction as the printing direction of the target partial printing (NO in S330 shown in FIG. 7), CPU 210 determines the correction level to be the second correction level (density correction amount: $\Delta V2$) in which the degree to lower the density of the image is larger than that of the first correction level (S340 shown in FIG. 7). As a result, it is possible to effectively suppress the color irregularity generated between the overlap area SA and the non-overlap area NA when the printing direction of the next partial printing is the opposite direction opposite to the printing direction of the target partial printing and when the printing direction of the next partial printing is the same direction as the printing direction of the target partial printing.

Further, according to this embodiment, CPU 210 executes the correction to lower the density for the pixels distributed to the target partial printing in S420 shown in FIG. 9 as described above. However, CPU 210 does not execute the correction to lower the density for the pixels distributed to the next partial printing. That is, the dot data generating process for the overlap area, which is performed for the portion of the overlap area SA to be printed by the former partial printing, includes the process to lower the density. However, the dot data generating process for the overlap area, which is performed for the portion to be printed by the latter partial printing, does not include the process to lower the density. As described above, the density of the overlap area SA is raised on the printing image PI due to the fact that the dots of the portion printed by the partial printing performed formerly tend to spread. Taking this fact into consideration, it is possible to more appropriately adjust the density of the overlap area SA on the printing image PI by performing the correcting process to lower the density for only the portion printed by the former partial printing.

Further, the RGB image RI shown in FIG. 4 and the printing image PI include the upstream side overlap area (for example, SA3 shown in FIG. 4) which is positioned on the upstream side in the conveying direction AR (lower side as viewed in FIG. 4) with respect to the specified non-overlap area NA (for example, NA3 shown in FIG. 4) and the downstream side overlap area (for example, SA2 shown in FIG. 4) which is positioned on the downstream side in the conveying direction AR (upper side as viewed in FIG. 4). In the example shown in FIG. 4, the image of the overlap area SA2 is printed by the two times of the partial printing SP2, SP3 performed in the same printing direction. On this account, the density correction for the image of the overlap area SA2 is performed by using the density correction amount $\Delta V2$. On the contrary, the image of the overlap area SA3 is printed by the two times of the partial printing SP3, SP4 performed in the mutually opposite printing directions. On this account, the density correction for the image of the overlap area SA3 is performed by using the density correction amount $\Delta V1$. In other words, the correction level for the upstream side overlap area as viewed from the specified non-overlap area NA and the correction level for the downstream side overlap area may be determined to be different levels. As a result, it is possible to flexibly adjust the density of the image of the overlap area SA for each of the areas. Therefore, it is possible to more effectively suppress the color irregularity generated between the non-overlap area NA and the overlap area SA.

As understood from the foregoing explanation, the non-overlap area NA in the first embodiment is an example of the first area, and the overlap area SA is an example of the second area. The partial image data of the RGB image data corresponding to the non-overlap area NA is an example of the first partial image data, and the partial image data corresponding to the overlap area SA is an example of the second partial image data. Further, the dot data generating process for the non-overlap area of S222, S224 shown in FIG. 6 is an example of the first area process, and the dot data generating process for the overlap area of S215 shown in FIG. 6 and FIG. 9 is an example of the second area process.

Second Embodiment

Figure 3:
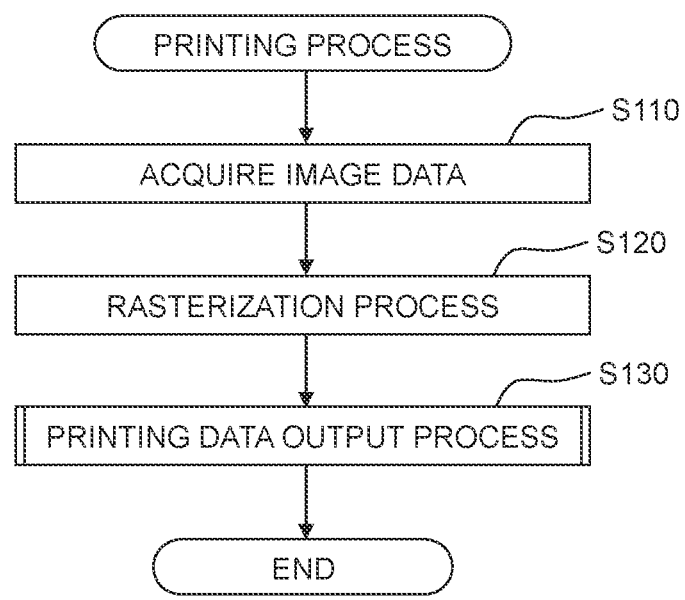
FIG. 3 shows a flow chart of a printing process.

In a second embodiment, the contents of the printing data output process of S130 of the printing process shown in FIG. 3 are different from those of the first embodiment. The other features of the printing process shown in FIG. 3 are the same as those of the first embodiment. In the printing data output process of the first embodiment, the correction level for the overlap area SA is determined on the basis of the predicted dot formation interval (FIG. 7) before starting the generation of the dot data corresponding to the overlap area SA of the RGB image RI. On the contrary, in the printing data output process of the second embodiment, the dot formation interval between the former partial printing and the latter partial printing for printing the overlap area SA is actually measured, and the correction level is determined on the basis of the actual measurement value.

Figure 11:
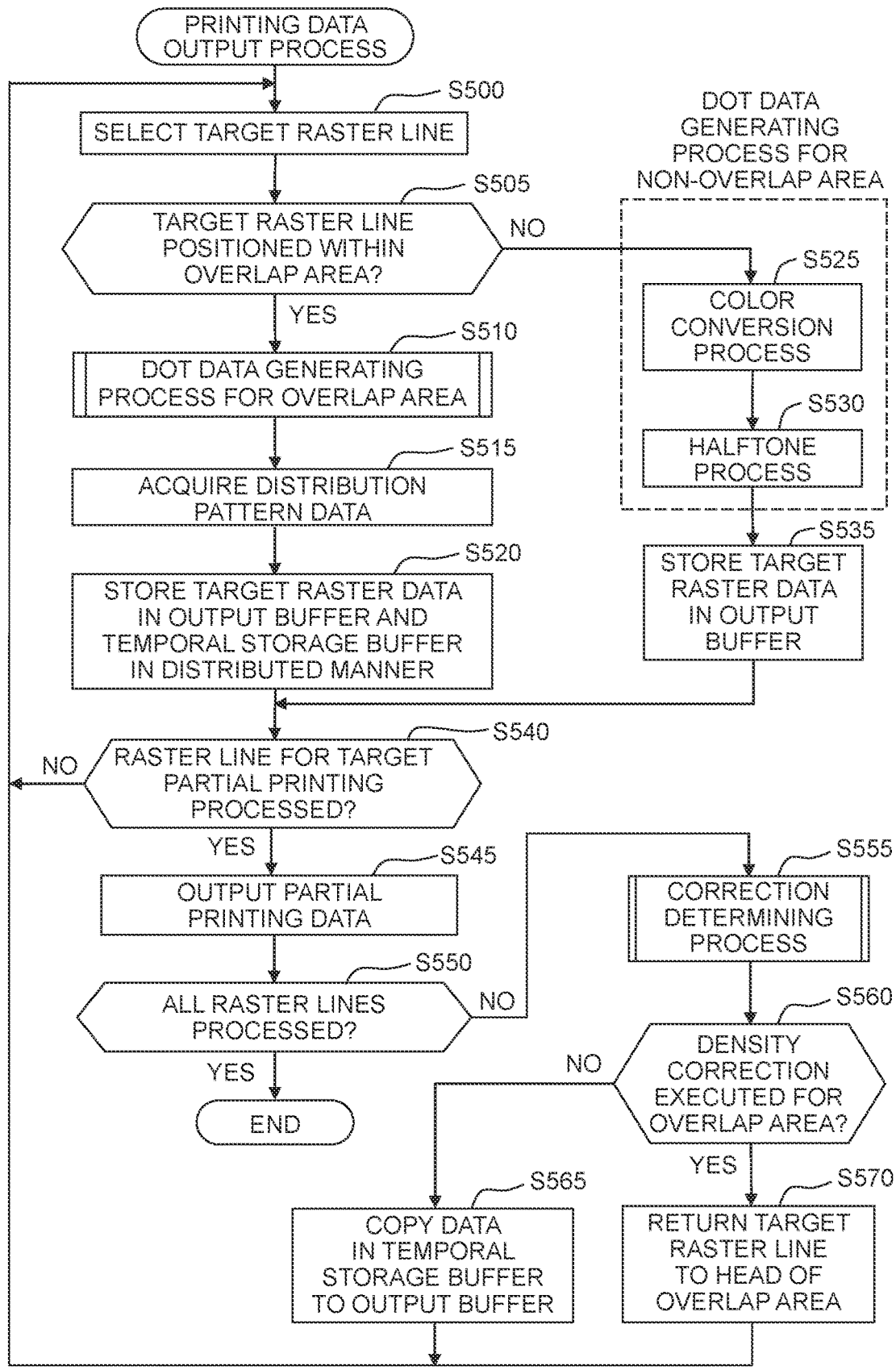
FIG. 11 shows a flow chart of a printing data output process according to a second embodiment.

In S500 shown in FIG. 11, CPU 210 selects one target raster line from the plurality of raster lines RL of the RGB image RI in the same manner as in S200 shown in FIG. 6. In S505, CPU 210 judges whether or not the target raster line is positioned within the overlap area SA in the same manner as in S210 shown in FIG. 6.

If the target raster line is not positioned within the overlap area SA (S505: NO), i.e., if the target raster line is positioned within the non-overlap area NA, then CPU 210 executes the dot data generating process for the non-overlap area in S525 and 5530, and CPU 210 stores the dot data corresponding to the generated target raster line in the output buffer in S535. The dot data generating process for the non-overlap area is performed in the same manner as in S222 and S224 shown in FIG. 6.

If the target raster line is positioned within the overlap area SA (S505: YES), CPU 210 executes, in S510, the dot data generating process for the overlap area shown in FIG. 12.

Figure 12:
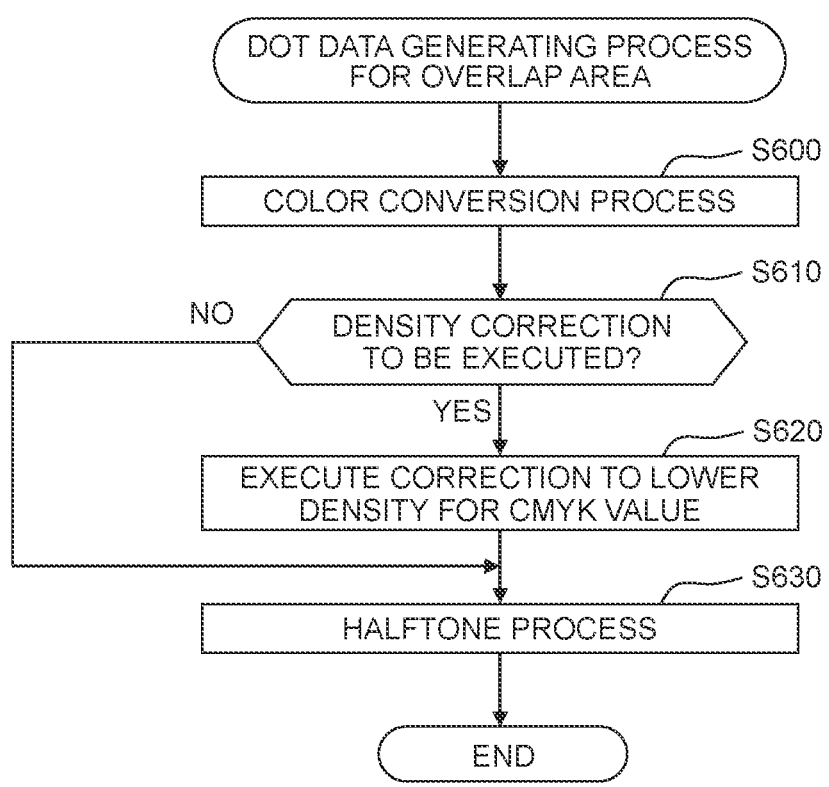
FIG. 12 shows a flow chart illustrating a dot data generating process for the overlap area according to the second embodiment.

In S600 shown in FIG. 12, CPU 210 executes the color conversion process for the data corresponding to the target raster line of the RGB image data in the same manner as in S400 shown in FIG. 9. Accordingly, the values of the plurality of pixels for constructing the target raster line are converted from the RGB values to the CMYK values.

In S610, CPU 210 judges whether or not the density correction is executed. If it is determined that the density correction is executed by the correction judging process in S555 shown in FIG. 11 described later on in relation to the overlap area SA in which the target raster line is positioned, it is judged that the density correction is executed. If it is determined that the density correction is not executed, it is judged that the density correction is not executed. Note that if the correction judging process of S555 is not executed for the overlap area SA in which the target raster line is positioned, it is judged that the density correction is not executed as the default judgment.

If it is judged that the density correction is executed (S610: YES), CPU 210 executes the correction to lower the density for the CMYK values of the plurality of pixels for constructing the target raster line in S620. Specifically, the values, which are obtained by multiplying the respective component values of C, M, Y, K by a coefficient α, are designated as the respective corrected component values. The coefficient α is a value which is larger than 0 and smaller than 1. For example, the coefficient α is 0.9. If it is judged that the density correction is not executed (S610: NO), S620 is skipped.

In S630, CPU 210 executes the half tone process for the CMYK values of the plurality of pixels for constructing the target raster line. Accordingly, the dot data corresponding to the target raster line is generated.

If the dot data generating process for the overlap area is terminated, CPU 210 acquires the distribution pattern data PD (FIG. 10A) corresponding to the target raster line in S515 shown in FIG. 11 in the same manner as in S415 shown in FIG. 9.

In S520, CPU 210 stores the dot data of the target raster line in the output buffer and the temporal storage buffer in a distributed manner in accordance with the distribution pattern data PD. That is, the data, which is included in the dot data of the target raster line and which indicates the dots to be formed by the target partial printing, is stored in the output buffer. The data, which indicates the dots to be formed by the partial printing next to the target partial printing, is stored in the temporal storage buffer.

In S540, CPU 210 judges whether or not all of the raster lines of the target partial printing have been processed as the target raster lines in the same manner as in S230 shown in FIG. 6. If all of the raster lines of the target partial printing have been processed (S540: YES), CPU 210 outputs the dot data of the target partial printing as the partial printing data to the printing mechanism 100 in S545 in the same manner as in S235 shown in FIG. 6. Note that the printing direction of the target partial printing may be determined in any way.

However, in this embodiment, for example, the printing direction of the target partial printing is always set to the outward direction. On this account, the control data, which indicates the outward direction as the printing direction, is added to the partial printing data to be outputted. When the printing mechanism 100 receives the partial printing data of the target partial printing, the printing mechanism 100 starts the target partial printing. If any unprocessed raster line of the target partial printing is present (S540: NO), CPU 210 returns to S500 to select the next raster line RL as the target raster line.

In S550, CPU 210 judges whether or not all of the raster lines in the RGB image RI have been processed as the target raster lines. If all of the raster lines have been processed (S550: YES), CPU 210 terminates the printing data output process. If any unprocessed raster line is present (S550: NO), CPU 210 executes the correction judging process shown in FIG. 13 in S555. The correction judging process is the process to determine whether or not the density correction is executed for the overlap area SA printed by the target partial printing and the next partial printing.

Figure 13:
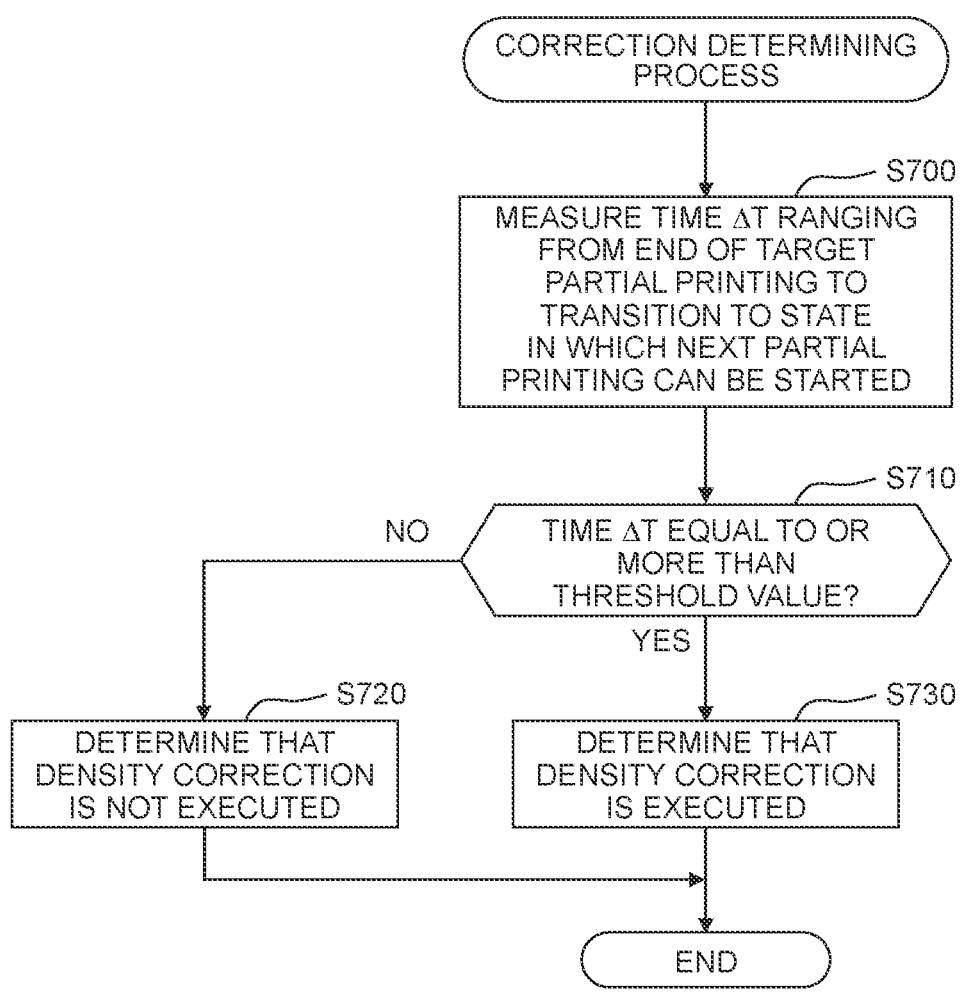
FIG. 13 shows a flow chart of a correction judging process.

In S700 shown in FIG. 13, CPU 210 measures the period ΔT ranging from the end of the target partial printing to the transition to the state in which the next partial printing can be started. As described above, if the partial printing data is outputted to the printing mechanism 100 in S545, the printing mechanism 100 starts the target partial printing. CPU 210 monitors the state of the printing mechanism 100 to detect the termination period (timing) of the target partial printing and specify the termination time of the target partial printing. CPU 210 continues the monitoring of the state of the printing mechanism 100 to detect the timing at which the transition brings about the state in which the next partial printing can be started and specify the time of the transition to the state in which the next partial printing can be started. CPU 210 calculates the period ΔT on the basis of the specified times. The state, in which the next partial printing can be started, means the state in which the main scanning of the next partial printing can be immediately started on condition that the partial printing data for the next partial printing is received. The state is, for example, such a state that the conveyance of the printing paper M is performed after the termination of the target partial printing, and the printing head 110 is moved to the predetermined initial position to perform the partial printing.

In this embodiment, the period ΔT is generally constant in the ordinary operation. However, if any irregular operation is performed, the period ΔT is prolonged in some cases as compared with the ordinary operation. As for the irregular operation, for example, such a case is assumed that the so-called flashing is performed between the target partial printing and the next partial printing. The flashing resides in such a process that the inks are discharged from the plurality of nozzles NZ respectively after the printing head is moved to a predetermined flashing position different from the position over the printing paper M in order to suppress the clog-up of the nozzles NZ. The flashing is executed by the printing mechanism 100, for example, if the discharge amount of the ink after the previous flashing exceeds a predetermined reference value.

In S710, CPU 210 judges whether or not the measured period ΔT is not less than a threshold value THt. The threshold value THt is set, for example, to the period which is longer by a predetermined amount than the period ΔT assumed for the ordinary operation. If the period ΔT is less than the threshold value THt (S710: NO), CPU 210 determines that the density correction is not executed for the overlap area SA printed by the target partial printing and the next partial printing in S720. If the period ΔT is not less than the threshold value THt (S710: YES), CPU 210 determines that the density correction is executed for the overlap area SA printed by the target partial printing and the next partial printing in S730.

In S560 shown in FIG. 11 after the correction judging process, it is judged whether or not the judgment is made to execute the density correction in the correction judging process. If the density correction is executed for the overlap area SA (S560: YES), the density correction is applied to the portion of the overlap area SA printed by the next partial printing, because the target partial printing has been already terminated at this point in time. On this account, it is necessary to redo the generation of the dot data of the overlap area SA printed by the next partial printing. Therefore, in this case, CPU 210 returns, in S570, the next target raster line to the raster line disposed at the head of the overlap area SA printed by the target partial printing and the next partial printing. Accordingly, in S500 in the next place, the raster line disposed at the head of the overlap area SA is selected as the next target raster line. For example, if the present target raster line is the most upstream raster line RL3 of the overlap area SA1, the next target raster line is returned to the most downstream raster line RL2 of the overlap area SA1.

If the density correction is not executed for the overlap area SA (S560: NO), it is unnecessary to redo the generation of the dot data of the overlap area SA printed by the next partial printing. On this account, in this case, CPU 210 copies the dot data having been already stored in the temporal storage buffer to the output buffer in S565. In this case, in S500 in the next place, the raster line disposed at the head of the non-overlap area NA disposed on the upstream side of the overlap area SA is selected as the next target raster line. For example, if the present target raster line is the most upstream raster line RL3 of the overlap area SA1 shown in FIG. 4, the next target raster line is the raster line disposed at the head of the non-overlap area NA2.

According to the second embodiment explained above, CPU 210 determines the correction level (specifically any one of the levels of the two stages to indicate whether or not the density correction is executed) (S710 to S730 shown in FIG. 13) on the basis of the actual measurement value of the period ΔT including the part of the dot formation interval. According to the configuration described above, the correction level is determined on the basis of the actual measurement value of the period ΔT. Therefore, it is possible to accurately determine the correction level. For example, even when any irregular operation such as the flashing or the like occurs, it is possible to effectively suppress the color irregularity generated between the overlap area SA and the non-overlap area NA in accordance with the dot formation interval.

In the second embodiment described above, the period ΔT is the period ranging from the predetermined timing in relation to the main scanning of the target partial printing (specifically the termination timing of the target partial printing) to the achievement of the state in which the main scanning of the next partial printing can be started. In this case, it is possible to generate the dot data for the next partial printing after measuring the period ΔT and determining the correction level. Therefore, it is possible to appropriately adjust the density of the image of the overlap area SA printed by the target partial printing and the next partial printing.

Further, in the second embodiment, CPU 210 determines the correction level of the portion of the overlap area SA printed by the target partial printing to be the previously determined level (specifically the level at which the density correction is not executed), and CPU 210 determines the correction level of the portion of the overlap area SA printed by the next partial printing to be the level based on the actual measurement value of the period ΔT (specifically any one of the levels at the two stages to indicate whether or not the density correction is executed). As a result, it is possible to appropriately lower the density of the image of the overlap area SA after the actual measurement of the period ΔT.

Modified Example 1

In the first embodiment described above, CPU 210 determines one correction level (any one of the density correction amounts ΔV1, ΔV2) with respect to one overlap area SA. In place thereof, as shown in FIG. 14, CPU 210 may determine a plurality of correction levels for respective portions with respect to one overlap area SA.

In the example shown in FIG. 14, the overlap area SA1 is printed by both of the former partial printing for printing the partial area RA1 and the latter partial printing for printing the partial area RA2. In the example shown in FIG. 14, as indicated by solid line arrows, the former partial printing is performed in the outward direction, and the latter partial printing is performed in the homeward direction. On this account, the dot formation interval in the overlap area SA1 differs depending on the position in the main scanning direction (X direction shown in FIG. 14). That is, in the area SA1, the more upstream side (the left side in FIG. 14) in the printing direction of the former partial printing (+X direction shown in FIG. 14) the position is disposed on, the longer the dot formation interval is. The more downstream side (right side shown in FIG. 14) the position is disposed on, the shorter the dot formation interval is.

On this account, in this modified embodiment, different correction levels are determined depending on the position in the main scanning direction of the overlap area SA1. That is, the different levels are determined for the correction level with respect to the first portion of the overlap area SA1 and the correction level for the second portion which has the position in the main scanning direction different from that of the first portion of the overlap area SA1. As a result, it is possible to flexibly adjust the density of the image of the overlap area SA1.

More specifically, CPU 210 divides the overlap area SA1 into a plurality of portions PT having different positions in the main scanning direction. CPU 210 determines the density correction amount for the respective portions PT so that the density correction amount is more increased on the more upstream side (left side shown in FIG. 14) in the printing direction of the former partial printing (+X direction shown in FIG. 14), and the density correction amount is more decreased on the more downstream side (right side shown in FIG. 14). As a result, the appropriate correction level corresponding to the dot formation interval is determined when the printing direction of the former partial printing and the printing direction of the latter partial printing are opposite to one another. Therefore, it is possible to more effectively suppress the color irregularity generated between the overlap area SA and the non-overlap area NA.

Note that in the example shown in FIG. 14, the density correction amount is determined for each of the rectangular portions PT including the plurality of pixels. However, the portion, for which the density correction amount is determined, may be constructed by one pixel. That is, the density correction amount may be determined to have the value which differs for each of the pixels having different positions in the main scanning direction.

Modified Example 2

In the respective embodiments described above, the printer 200 is the serial printer which is provided with the main-scan section 130. In place thereof, as shown in FIG. 15, the printer may be a so-called line printer which is not provided with any main-scan section. The Y direction shown in FIG. 15 is the conveying direction ARd of the printing paper M. A printing head 110*d* shown in FIG. 15 is the printing head which is provided in order to print a monochrome image by using the K ink. The printing head 110*d* of the line printer is provided with a plurality of nozzles NZd which are aligned over approximately the same length as the width in the X direction of the printing paper M in the X direction intersecting the conveying direction ARd.

The printing head 110*d* is provided with three head units HU1 to HU3. The head units HU1 to HU3 have mutually different positions in the X direction, and they are aligned in an order of final numerals (1 to 3) from the upstream side in the X direction. The two head units HU1, HU3 have the same position in the Y direction. The positions in the Y direction of the two head units HU1, HU3 are deviated from the position in the Y direction of the one head unit HU2. A part of the head unit HU1 including the downstream end in the X direction has the position in the X direction which is overlapped with the position in the X direction of a part of the head unit HU2 including the upstream end in the X direction. A part of the head unit HU2 including the downstream end in the X direction has the position in the X direction which is overlapped with the position in the X direction of a part of the head unit HU3 including the upstream end in the X direction. A nozzle array, which is composed of the nozzles NZd for discharging the K ink, is formed in each of the head units HU1 to HU3.

FIG. 15 shows an exemplary printing image PId to be printed on the printing paper M. The line printer forms dots on the printing paper M by discharging the ink from the printing head 110*d* onto the printing paper M conveyed in the conveying direction ARd. Accordingly, the printing image PId is printed. The printing image PId includes a plurality of raster lines RLd (for example, RLd1, RLd2 shown in FIG. 15) which extend in the Y direction shown in FIG. 15 (conveying direction ARd upon the printing) and which have mutually different positions in the X direction. Each of the raster lines RLd is a line on which a plurality of dots may be formed.

The printing image PId includes a plurality of non-overlap areas NAd (for example, unhatched areas NAd1 to NAd3 shown in FIG. 15) and a plurality of overlap areas SAd (for example, hatched areas SAd1, SAd2 shown in FIG. 15).

Each of the raster lines RLd in the non-overlap area NAd (for example, RLd1 shown in FIG. 15) corresponds to one nozzle NZd. That is, the dots of the K ink on each of the raster lines RLd in the non-overlap area NAd are formed by using one nozzle NZd.

Each of the raster lines RLd in the overlap area SAd (for example, RLd2 shown in FIG. 15) corresponds to two nozzles NZd. That is, the dots of the K ink on each of the raster lines RLd in the overlap area SAd are formed by using two nozzles NZd.

In this way, the overlap area SAd is provided between the two non-overlap areas NAd in relation to the printing head 110*d* of the line printer, and thus it is possible to suppress the appearance of the white stripe and/or the black stripe at the joint portion of the head unit on the printing image PId.

In the case of the line printer, there is the time lag in the overlap area SAd between the timing at which the dots are formed by one nozzle and the timing at which the dots are formed by the other nozzle. On this account, the density of the image in the overlap area SAd tends to be higher than the density of the image in the non-overlap area NAd on the printing image PId. Also in the case of the line printer, the dot data generating process for the overlap area (FIG. 9) may be executed in the same manner as in the first embodiment when the dot data corresponding to the overlap area SAd is generated. Further, the dot data generating process for the non-overlap area (S222, S224 shown in FIG. 6) may be executed in the same manner as in the first embodiment when the dot data corresponding to the non-overlap area NAd is generated. In this case, in the same manner as in the respective embodiments described above, the correction level is set in the dot data generating process for the overlap area so that the larger the time lag described above is, the larger the degree to lower the density is. The faster the conveying speed of the printing paper M is, the smaller the time lag described above is. The slower the conveying speed is, the larger the time lag described above is. For example, in the low speed high image quality mode in which the conveying speed of the printing paper M is relatively slow, the time lag is increased as compared with the high speed low image quality mode in which the conveying speed of the printing paper M is relatively fast, and hence the color irregularity tends to be conspicuous between the overlap area SAd and the non-overlap area NAd. On this account, for example, the correction level is set so that the degree to lower the density is large in the low speed high image quality mode as compared with the high speed low image quality mode. Accordingly, it is possible to suppress any conspicuous color irregularity between the overlap area SAd and the non-overlap area NAd in relation to the line printer as well.

Modified Example 3

In the correction judging process of the second embodiment described above (FIG. 13), the correction level is determined to be any one of the two levels or stages, i.e., the level at which the density of the image is lowered and the level at which the density of the image is not lowered (S720, S730). In place thereof, in the correction judging process of the second embodiment, the correction level may be determined to be any one of the density correction amounts ΔV1, ΔV2 in the same manner as in the first embodiment. Further, in the control judging process of the first embodiment (FIG. 7), the correction level may be determined to be any one of the two levels, i.e., the level at which the density of the image is lowered and the level at which the density of the image is not lowered, in the same manner as in the second embodiment.

Modified Example 4

In the first embodiment described above, the correction to lower the density is executed for only the portion of the overlap area SA to be printed by the former partial printing (S420 shown in FIG. 9). In place thereof, the correction to lower the density may be executed for all of the pixels of the overlap area SA, i.e., both of the portion to be printed by the former partial printing and the portion to be printed by the latter partial printing.

Modified Example 5

In the first embodiment described above, the plurality of density correction amounts ΔV1, ΔV2 are used when one printing image PI is printed. In place thereof, for example, the density correction amounts ΔV1, ΔV2 may be properly used for each of the printing modes. For example, the dot formation interval is prolonged in the unidirectional printing mode (for example, the low speed high image quality mode) in which the printing is performed by the partial printing in the outward direction as compared with the bidirectional printing mode (for example, the high speed low image quality mode) in which the partial printing in the outward direction and the partial printing in the homeward direction are alternately performed. On this account, the density correction amount may be always determined to be ΔV1 in the bidirectional printing mode, and the density correction amount may be always determined to be ΔV2 having the large degree to lower the density as compared with ΔV1 in the unidirectional printing mode.

Modified Example 6

In the control judging process of the first embodiment described above, the plurality of blocks BLs are set for the entire partial area (for example, the partial area RA2 shown in FIG. 8) to be printed by the partial printing next to the target partial printing, and the evaluation value EV is calculated for each of the blocks BLs. In place thereof, for example, the evaluation value EV may be calculated for each of the pixels, and the correction level may be determined on the basis of each of these values. Further, in the control judging process, it is unnecessary to use the entire partial area (for example, the partial area RA2 shown in FIG. 8) to be printed by the next partial printing, and it is also allowable to use only a part of the partial area. Further, in the control judging process, it is also allowable to use at least a part of the partial area (for example, the partial area RA1 shown in FIG. 8) to be printed by the target partial printing, in addition to the partial area to be printed by the next partial printing. Alternatively, in the control judging process, it is also allowable to use only the partial area to be printed by the target partial printing, in place of the partial area to be printed by the next partial printing.

Modified Example 7

In the dot data generating process for the overlap area of each of the embodiments described above, the correcting process (S420 shown in FIG. 9) is executed for the CMYK image data after the color conversion process. In place thereof, the correcting process to lower the density may be executed for the RGB image data before the color conversion process. Further, for example, it is also allowable to use a look-up table for the overlap area adjusted to make conversion into the CMYK value in which the density is low as compared with the ordinary look-up table in the color conversion process in the dot data generating process for the overlap area. Alternatively, it is also allowable to use the value to indicate the density higher than the ordinary density, as the relative density value of the dot used, for example, for the error diffusion in the half tone process in the dot data generating process for the overlap area.

Modified Example 8

In the respective embodiments described above, all of the raster lines of one non-overlap area NA are printed by one time of the partial printing SP. In place thereof, the plurality of raster lines of one non-overlap area NA, which are adjacent to one another, may be printed in a divided manner by a plurality of times of the partial printing (so-called interlace printing). For example, the odd number raster lines of the non-overlap area NA may be printed by the first partial printing, and the even number raster lines may be printed by the second partial printing. Also in this case, the plurality of dots, which are formed on each of the raster lines of the non-overlap area NA, are printed by one time of the partial printing by using one nozzle NZ. If one non-overlap area NA is printed by two times of the partial printing, one overlap area SA is printed by four times of the partial printing. For example, the plurality of dots, which are formed on the odd number raster lines of the overlap area SA, are printed by two times of the partial printing by using two nozzles NZ, and the plurality of dots, which are formed on the even number raster lines, are printed by another two times of the partial printing by using two nozzles NZ.

Modified Example 9

In the dot data generating process for the non-overlap area in the respective embodiments described above (S222, S224 shown in FIG. 6), the correction to lower the density is not executed for the non-overlap area NA. In place thereof, the correction may be executed for the vicinity of the upstream end and/or the downstream end of the non-overlap area NA making contact with the overlap area SA in the dot data generating process for the non-overlap area. That is, the correction to lower the density may be executed for the overlap area SA and the end portion of the non-overlap area making contact with the overlap area SA. In this case, for example, the correction amount of the non-overlap area NA (degree to lower the density) may be smaller than that of the overlap area SA. According to this modified embodiment, it is possible to suppress the occurrence of the color difference at the boundary between the overlap area SA and the non-overlap area NA. Therefore, for example, it is possible to suppress the appearance of any stripe at the boundary between the overlap area SA and the non-overlap area NA.

Modified Example 10

Any other medium, for example, film for OHP, CD-ROM, or DVD-ROM may be adopted as the printing medium in place of the printing paper M.

Modified Example 11

In the printing mechanism 100 of the embodiments described above, the printing paper M is relatively moved in the conveying direction with respect to the printing head 110 by allowing the conveying unit 140 to convey the printing paper M. In place thereof, the printing paper M may be relatively moved in the conveying direction AR with respect to the printing head 110 by moving the printing head 110 in the direction opposite to the conveying direction AR with respect to the fixed printing paper M.

Modified Example 12

In the respective embodiments described above, the apparatus or device, which executes the printing process shown in FIG. 3, is the printer 200. In place thereof, a terminal device such as a personal computer or the like, which is connected to the printer 200, may execute the printing process shown in FIG. 3. In this case, CPU of the terminal device executes the printing process shown in FIG. 3 by executing, for example, a printer driver program. In this case, CPU of the terminal device allows the printer 200 as the print execution section to execute the printing by sending the partial printing data to the printer 200 in S235 shown in FIG. 6.

Further, the apparatus or device, which executes the printing process shown in FIG. 3, may be, for example, a server which acquires the image data from the printer or the terminal device to generate the printing job by using the image data. The server as described above may be a plurality of computers which can make mutual communication via a network.

Modified Example 13

In the respective embodiments described above, a part of the configuration realized by the hardware may be substituted with any software. On the contrary, a part or all of the configuration realized by the software may be substituted with any hardware. For example, when the printing process shown in FIG. 3 is executed by the printer 200, the half tone process and/or the color conversion process may be realized, for example, by any exclusively usable hardware circuit (for example, ASIC) which is operated in accordance with the instruction of CPU 210 of the printer 200.

The present invention has been explained above on the basis of the embodiments and the modified embodiments. However, the foregoing embodiments of the present invention are provided in order to easily understand the present invention, and the embodiments do not limit the present invention. The present invention may be changed and/or improved without deviating from claims and the gist or essential characteristics thereof. The present invention includes equivalents thereof.

What is claimed is:

1. A printing apparatus comprising:
   a printing head which has a plurality of nozzles for discharging ink of specified color, the nozzles being aligned in a first direction;
   a head driver which drives the printing head to discharge the ink of the specified color thereby forming dots of the specified color on a printing medium;
   a conveyor which conveys the printing medium relatively with respect to the printing head in any direction of the first direction and a second direction intersecting with the first direction, wherein the conveyor is a sub-scan section which is configured to execute subsidiary scanning for conveying the printing medium in the first direction relatively with respect to the printing head;
   a main-scan section configured to execute main scanning for moving the printing head in the second direction with respect to the printing medium, and
   a controller configured to:
      acquire object image data;
      generate a plurality of pieces of dot data, which represent formation states of the dots of the specified color, for a plurality of pixels by using the object image data; and
      print a printing image including the dots of the specified color on the printing medium by causing the printing head and the conveyor to discharge the ink of the specified color and convey the printing medium by using the plurality of pieces of dot data, wherein the printing image includes two first areas and a second area positioned between the two first areas, the printing image includes a plurality of raster lines each including the dots of the specified color aligned in the second direction,
the raster lines include a plurality of first raster lines included in each of the two first areas, and a plurality of second raster lines included in the second area,
the dots of the specified color constructing each of the first raster lines are formed by using one of the nozzles corresponding to the first raster line,
the dots of the specified color constructing each of the second raster lines are formed by using two or more of the nozzles corresponding to the second raster line,
the controller is configured to:
   execute a first area process for first partial image data which is included in the object image data and which corresponds to each of the two first areas, to generate a plurality of pieces of first partial dot data which are included in the plurality of pieces of dot data and which correspond to each of the two first areas; and
   execute a second area process for second partial image data which is included in the object image data and which corresponds to the second area, to generate a plurality of pieces of second partial dot data which are included in the plurality of pieces of dot data and which correspond to the second area,
the second area process is a process for generating the second partial dot data such that an image of the second area is printed at a density which is not more than a density in a case of executing the first area process for the second partial image data,
the two or more nozzles, which correspond to each of the second raster lines, include a first nozzle and a second nozzle,
the controller is configured to:
   determine a correction level, which is a degree to lower the density of the image of the second area in the second area process, based on a dot formation interval which is an interval between a formation timing of the dots of the specified color by using the first nozzle and a formation timing of the dots of the specified color by using the second nozzle; and
   execute the second area process based on the correction level, and the controller is configured to:
   determine the correction level to be a first correction level in a case that the dot formation interval is a first interval; and
   determine the correction level to be a second correction level which has a large degree to lower the density of the image of the second area as compared with the first correction level, in a case that the dot formation interval is a second interval which is longer than the first interval,
the controller is configured to:
   print the printing image on the printing medium by causing the printing head, the main-scan section, and the sub-scan section to execute a plurality of times the subsidiary scanning and partial printing for discharging the ink of the specified color from the printing head while performing the main scanning by using the plurality of pieces of dot data,
the dots of the specified color, which are included in each of the first raster lines, are formed by one time of the partial printing,
the dots of the specified color, which are included in each of the second raster lines, are formed by two or more times of the partial printing including a first partial printing and a second partial printing, the dot formation interval is the interval between the formation timing of the dots of the specified color in the first partial printing and the formation timing of the dots of the specified color in the second partial printing;

determine the direction of the main scanning in the second partial printing to be any one of the opposite direction opposite to the direction of the main scanning in the first partial printing and the same direction as the direction of the main scanning in the first partial printing, by using at least one of the data which is included in the object image data and corresponds to the first partial printing, and the data which is included in the object image data and corresponds to the second partial printing;

determine the correction level to be the first correction level in a case that the direction of the main scanning in the second partial printing is determined to be the opposite direction opposite to the direction of the main scanning in the first partial printing; and determine the correction level to be the second correction level in a case that the direction of the main scanning in the second partial printing is determined to be the same direction as the direction of the main scanning in the first partial printing.

2. The printing apparatus according to claim 1,
wherein the first interval is the dot formation interval in a case that a direction of the main scanning in the first partial printing is opposite to a direction of the main scanning in the second partial printing, and the second interval is the dot formation interval in a case that the direction of the main scanning in the first partial printing is the same as the direction of the main scanning in the second partial printing.

3. A printing apparatus comprising:
a printing head which has a plurality of nozzles for discharging ink of specified color, the nozzles being aligned in a first direction;
a head driver which drives the printing head to discharge the ink of the specified color thereby forming dots of the specified color on a printing medium;
a conveyor which conveys the printing medium relatively with respect to the printing head in any direction of the first direction and a second direction intersecting with the first direction, wherein the conveyor is a sub-scan section which is configured to execute subsidiary scanning for conveying the printing medium in the first direction relatively with respect to the printing head;
a main-scan section configured to execute main scanning for moving the printing head in the second direction with respect to the printing medium; and
a controller configured to:
acquire object image data;
generate a plurality of pieces of dot data, which represent formation states of the dots of the specified color, for a plurality of pixels by using the object image data; and
print a printing image including the dots of the specified color on the printing medium by causing the printing head and the conveyor to discharge the ink of the specified color and convey the printing medium by using the plurality of pieces of dot data,
wherein the printing image includes two first areas and a second area positioned between the two first areas,
the printing image includes a plurality of raster lines each including the dots of the specified color aligned in the second direction, the raster lines include a plurality of first raster lines included in each of the two first areas, and a plurality of second raster lines included in the second area, the dots of the specified color constructing each of the first raster lines are formed by using one of the nozzles corresponding to the first raster line, the dots of the specified color constructing each of the second raster lines are formed by using two or more of the nozzles corresponding to the second raster line, the controller is configured to:
execute a first area process for first partial image data which is included in the object image data and which corresponds to each of the two first areas, to generate a plurality of pieces of first partial dot data which are included in the plurality of pieces of dot data and which correspond to each of the two first areas; and execute a second area process for second partial image data which is included in the object image data and which corresponds to the second area, to generate a plurality of pieces of second partial dot data which are included in the plurality of pieces of dot data and which correspond to the second area, the second area process is a process for generating the second partial dot data such that an image of the second area is printed at a density which is not more than a density in a case of executing the first area process for the second partial image data, the two or more nozzles, which correspond to each of the second raster lines, include a first nozzle and a second nozzle, the controller is configured to:
determine a correction level, which is a degree to lower the density of the image of the second area in the second area process, based on a dot formation interval which is an interval between a formation timing of the dots of the specified color by using the first nozzle and a formation timing of the dots of the specified color by using the second nozzle; and execute the second area process based on the correction level, and the controller is configured to:
determine the correction level to be a first correction level in a case that the dot formation interval is a first interval; and determine the correction level to be a second correction level which has a large degree to lower the density of the image of the second area as compared with the first correction level, in a case that the dot formation interval is a second interval which is longer than the first interval, the controller is configured to:
print the printing image on the printing medium by causing the printing head, the main-scan section, and the sub-scan section to execute a plurality of times the subsidiary scanning and partial printing for discharging the ink of the specified color from the printing head while performing the main scanning by using the plurality of pieces of dot data, the dots of the specified color, which are included in each of the first raster lines, are formed by one time of the partial printing, the dots of the specified color, which are included in each of the second raster lines, are formed by two or more times of the partial printing including a first partial printing and a second partial printing, the dot formation interval is the interval between the formation timing of the dots of the specified color in the first partial printing and the formation timing of the dots of the specified color in the second partial printing;

wherein the second area process, which is executed for the portion included in the second area and to be printed by the first partial printing, includes a process for lowering the density, and the second area process, which is executed for the portion included in the second area and to be printed by the second partial printing, does not include any process for lowering the density.

4. A printing apparatus comprising:

a printing head which has a plurality of nozzles for discharging ink of specified color, the nozzles being aligned in a first direction;

a head driver which drives the printing head to discharge the ink of the specified color thereby forming dots of the specified color on a printing medium;

a conveyor which conveys the printing medium relatively with respect to the printing head in any direction of the first direction and a second direction intersecting with the first direction, wherein the conveyor is a sub-scan section which is configured to execute subsidiary scanning for conveying the printing medium in the first direction relatively with respect to the printing head;

a main-scan section configured to execute main scanning for moving the printing head in the second direction with respect to the printing medium; and a controller configured to:
  acquire object image data;
  generate a plurality of pieces of dot data, which represent formation states of the dots of the specified color, for a plurality of pixels by using the object image data; and
  print a printing image including the dots of the specified color on the printing medium by causing the printing head and the conveyor to discharge the ink of the specified color and convey the printing medium by using the plurality of pieces of dot data, wherein the printing image includes two first areas and a second area positioned between the two first areas, the printing image includes a plurality of raster lines each including the dots of the specified color aligned in the second direction, the raster lines include a plurality of first raster lines included in each of the two first areas, and a plurality of second raster lines included in the second area, the dots of the specified color constructing each of the first raster lines are formed by using one of the nozzles corresponding to the first raster line, the dots of the specified color constructing each of the second raster lines are formed by using two or more of the nozzles corresponding to the second raster line, the controller is configured to:
  execute a first area process for first partial image data which is included in the object image data and which corresponds to each of the two first areas, to generate a plurality of pieces of first partial dot data which are included in the plurality of pieces of dot data and which correspond to each of the two first areas; and
  execute a second area process for second partial image data which is included in the object image data and which corresponds to the second area, to generate a plurality of pieces of second partial dot data which are included in the plurality of pieces of dot data and which correspond to the second area, the second area process is a process for generating the second partial dot data such that an image of the second area is printed at a density which is not more than a density in a case of executing the first area process for the second partial image data, the two or more nozzles, which correspond to each of the second raster lines, include a first nozzle and a second nozzle, the controller is configured to:
  determine a correction level, which is a degree to lower the density of the image of the second area in the second area process, based on a dot formation interval which is an interval between a formation timing of the dots of the specified color by using the first nozzle and a formation timing of the dots of the specified color by using the second nozzle; and
  execute the second area process based on the correction level, and the controller is configured to:
  determine the correction level to be a first correction level in a case that the dot formation interval is a first interval; and
  determine the correction level to be a second correction level which has a large degree to lower the density of the image of the second area as compared with the first correction level, in a case that the dot formation interval is a second interval which is longer than the first interval, the controller is configured to:
  print the printing image on the printing medium by causing the printing head, the main-scan section, and the sub-scan section to execute a plurality of times the subsidiary scanning and partial printing for discharging the ink of the specified color from the printing head while performing the main scanning by using the plurality of pieces of dot data, the dots of the specified color, which are included in each of the first raster lines, are formed by one time of the partial printing, the dots of the specified color, which are included in each of the second raster lines, are formed by two or more times of the partial printing including a first partial printing and a second partial printing, the dot formation interval is the interval between the formation timing of the dots of the specified color in the first partial printing and the formation timing of the dots of the specified color in the second partial printing;

wherein the printing image includes a plurality of first areas including the two first areas and a plurality of second areas including the second area, the controller is configured to form the dots of the specified color in a specified first area, an upstream side second area, and a downstream side second area by the first partial printing, the specified first area being included in the first areas, the upstream side second area being included in the second areas and being adjacent to the specified first area on an upstream side in the first direction, the downstream side second area being included in the second areas and being adjacent to the specified first area on a downstream side in the first direction, and the controller is configured to determine the correction level for the upstream side second area and the correction level for the downstream side second area to be different levels.

5. A printing apparatus comprising:
a printing head which has a plurality of nozzles for discharging ink of specified color, the nozzles being aligned in a first direction;
a head driver which drives the printing head to discharge the ink of the specified color thereby forming dots of the specified color on a printing medium;
a conveyor which conveys the printing medium relatively with respect to the printing head in any direction of the first direction and a second direction intersecting with the first direction, wherein the conveyor is a sub-scan section which is configured to execute subsidiary scanning for conveying the printing medium in the first direction relatively with respect to the printing head;
a main-scan section configured to execute main scanning for moving the printing head in the second direction with respect to the printing medium; and
a controller configured to:
acquire object image data;
generate a plurality of pieces of dot data, which represent formation states of the dots of the specified color, for a plurality of pixels by using the object image data; and
print a printing image including the dots of the specified color on the printing medium by causing the printing head and the conveyor to discharge the ink of the specified color and convey the printing medium by using the plurality of pieces of dot data,
wherein the printing image includes two first areas and a second area positioned between the two first areas,
the printing image includes a plurality of raster lines each including the dots of the specified color aligned in the second direction,
the raster lines include a plurality of first raster lines included in each of the two first areas, and a plurality of second raster lines included in the second area,
the dots of the specified color constructing each of the first raster lines are formed by using one of the nozzles corresponding to the first raster line,
the dots of the specified color constructing each of the second raster lines are formed by using two or more of the nozzles corresponding to the second raster line,
the controller is configured to:
execute a first area process for first partial image data which is included in the object image data and which corresponds to each of the two first areas, to generate a plurality of pieces of first partial dot data which are included in the plurality of pieces of dot data and which correspond to each of the two first areas; and
execute a second area process for second partial image data which is included in the object image data and which corresponds to the second area, to generate a plurality of pieces of second partial dot data which are included in the plurality of pieces of dot data and which correspond to the second area,
the second area process is a process for generating the second partial dot data such that an image of the second area is printed at a density which is not more than a density in a case of executing the first area process for the second partial image data,
the two or more nozzles, which correspond to each of the second raster lines, include a first nozzle and a second nozzle,
the controller is configured to:
determine a correction level, which is a degree to lower the density of the image of the second area in the second area process, based on a dot formation interval which is an interval between a formation timing of the dots of the specified color by using the first nozzle and a formation timing of the dots of the specified color by using the second nozzle; and
execute the second area process based on the correction level, and
the controller is configured to:
determine the correction level to be a first correction level in a case that the dot formation interval is a first interval; and
determine the correction level to be a second correction level which has a large degree to lower the density of the image of the second area as compared with the first correction level, in a case that the dot formation interval is a second interval which is longer than the first interval,
the controller is configured to:
print the printing image on the printing medium by causing the printing head, the main-scan section, and the sub-scan section to execute a plurality of times the subsidiary scanning and partial printing for discharging the ink of the specified color from the printing head while performing the main scanning by using the plurality of pieces of dot data,
the dots of the specified color, which are included in each of the first raster lines, are formed by one time of the partial printing,
the dots of the specified color, which are included in each of the second raster lines, are formed by two or more times of the partial printing including a first partial printing and a second partial printing,
the dot formation interval is the interval between the formation timing of the dots of the specified color in the first partial printing and the formation timing of the dots of the specified color in the second partial printing;
wherein the second area includes a first portion and a second portion which has a position in the second direction different from that of the first portion,
the controller is configured to determine the correction level for the first portion and the correction level for the second portion to be different levels,
wherein the second partial printing is executed after the first partial printing,
the direction of the main scanning in the second partial printing is opposite to the direction of the main scanning in the first partial printing,
the first portion is positioned on the upstream side in the direction of the main scanning in the first partial printing as compared with the second portion, and
the controller is configured to determine a level as the correction level for the first portion such that the degree to lower the density of the image is large as compared with the correction level for the second portion.

* * * * *